United States Patent
Uemura et al.

(10) Patent No.: US 9,949,297 B2
(45) Date of Patent: Apr. 17, 2018

(54) TERMINAL DEVICE, BASE STATION APPARATUS, COMMUNICATION SYSTEM, COMMUNICATION METHOD, AND INTEGRATED CIRCUIT

(71) Applicant: Sharp Kabushiki Kaisha, Sakai, Osaka (JP)

(72) Inventors: Katsunari Uemura, Sakai (JP); Hidekazu Tsuboi, Sakai (JP); Yasuyuki Kato, Sakai (JP)

(73) Assignee: Sharp Kabushiki Kaisha, Osaka (JP)

(*) Notice: Subject to any disclaimer, the term of this patent is extended or adjusted under 35 U.S.C. 154(b) by 58 days.

(21) Appl. No.: 15/126,152

(22) PCT Filed: Mar. 16, 2015

(86) PCT No.: PCT/JP2015/057742
§ 371 (c)(1),
(2) Date: Sep. 14, 2016

(87) PCT Pub. No.: WO2015/141637
PCT Pub. Date: Sep. 24, 2015

(65) Prior Publication Data
US 2017/0111932 A1    Apr. 20, 2017

(30) Foreign Application Priority Data
Mar. 19, 2014  (JP) .................... 2014-056035

(51) Int. Cl.
*H04W 74/08*    (2009.01)
*H04L 5/00*     (2006.01)
(Continued)

(52) U.S. Cl.
CPC ....... *H04W 74/0833* (2013.01); *H04L 5/0048* (2013.01); *H04L 5/0055* (2013.01);
(Continued)

(58) Field of Classification Search
None
See application file for complete search history.

(56) References Cited

U.S. PATENT DOCUMENTS

2015/0043490 A1* 2/2015 Wu .................. H04W 8/26
                                              370/329
2015/0119048 A1* 4/2015 Yang ................ H04W 16/32
                                              455/444

(Continued)

OTHER PUBLICATIONS

NTT Docomo, Inc., "Introduction of Dual Connectivity", 3GPP TSG-RAN WG2 #85 R2-140906, Feb. 2014, 46 pages.
(Continued)

*Primary Examiner* — Faruk Hamza
*Assistant Examiner* — Cassandra L Decker
(74) *Attorney, Agent, or Firm* — Birch, Stewart, Kolasch & Birch, LLP

(57) ABSTRACT

There are provided a technology associated with a terminal device, a base station apparatus, a communication system, a communication method, and an integrated circuit, in all of which efficient communication control is performed. A terminal device makes a connection to a base station apparatus using a first cell group and second cell group, and, in a case where the second cell group that includes at least one cell is changed based on an information element which is notified with a radio resource control message that is received from the base station apparatus, starts counting of an RRC timer relating to a random access procedure for the cell in the second cell group, and initiates the random access.

3 Claims, 7 Drawing Sheets

(51) Int. Cl.
*H04L 27/26* (2006.01)
*H04W 16/32* (2009.01)
*H04W 76/04* (2009.01)
*H04W 88/08* (2009.01)
*H04W 88/02* (2009.01)

(52) U.S. Cl.
CPC ......... *H04L 27/2601* (2013.01); *H04W 16/32* (2013.01); *H04W 76/046* (2013.01); *H04W 88/02* (2013.01); *H04W 88/08* (2013.01)

(56) References Cited

U.S. PATENT DOCUMENTS

| | | | | |
|---|---|---|---|---|
| 2015/0134838 A1* | 5/2015 | Jeong | .................. | H04L 5/0098 709/227 |
| 2015/0181473 A1* | 6/2015 | Horn | .................. | H04W 36/0027 370/331 |
| 2015/0223270 A1* | 8/2015 | Kim | .................. | H04W 74/0833 370/329 |
| 2015/0351139 A1* | 12/2015 | Zhang | .................. | H04W 52/0251 370/329 |
| 2016/0066255 A1* | 3/2016 | Marinier | .................. | H04W 48/16 370/350 |
| 2016/0249210 A1* | 8/2016 | Chang | .................. | H04W 12/04 |
| 2016/0295613 A1* | 10/2016 | Wager | .................. | H04L 41/0813 |

OTHER PUBLICATIONS

NTT Docomo, Inc., NSN, "Introduction of Dual Connectivity", 3GPP TSG-RAN WG2 #85 R2-140936, Feb. 14, 2014, 47 pages, 7.6, 10.1.5, Annex L.

Samsung, "Introduction of Dual Connectivity", 3GPP TSG-RAN2 Meeting #85 R2-140596, Feb. 1, 2014, 33 pages.

Samsung, "Triggering Random Access towards SeNB", 3GPP TSG-RAN WG2 Meeting #85 R2-140246, Feb. 2014, 5 pages.

Sharp, "Signalling flow of SeNB reconfiguration procedure", 3GPP TSG-RAN WG2#84 R2-134235, Nov. 1, 2013, 6 pages.

\* cited by examiner

TERMINAL DEVICE, BASE STATION APPARATUS, COMMUNICATION SYSTEM, COMMUNICATION METHOD, AND INTEGRATED CIRCUIT

TECHNICAL FIELD

The present invention relates to a technology associated with a terminal device, a base station apparatus, a communication system, a communication method, and an integrated circuit, in all of which efficient communication control is performed.

This application claims the benefit of Japanese Priority Patent Application No. 2014-056035 filed on Mar. 19, 2014, the entire contents of which are incorporated herein by reference.

BACKGROUND ART

In 3rd Generation Partnership Project (3GPP) that is a standardization project, a standardization process for Evolved Universal Terrestrial Radio Access (which is hereinafter referred to as EUTRA) that realizes high-speed communication has been performed by employing flexible scheduling in prescribed frequency or time units, which is referred to as an Orthogonal Frequency-Division Multiplexing (OFDM) communication scheme or a resource block.

Furthermore, in 3GPP, a study on Advanced EUTRA (which is also referred to as LTE Advanced) that realizes higher-speed data transfer has been conducted. In EUTRA, a communication system is available on the assumption of a network in which a base station apparatuses have almost the same cell constitution (cell size). However, in Advanced EUTRA, a study on the communication system has been conducted on the assumption of a network (heterogeneous wireless network or Heterogeneous Network) in which the base station apparatuses (the cells) having different constitutions are present in a mixed manner in the same area.

A study has been conducted on a technology (Dual Connectivity) in which, like in the heterogeneous network, in the communication system in which a cell (macro cell) having a great radius and a cell (small cell) having a smaller radius than the macro cell are arranged, a terminal device makes a connection to each of the macro cell and the small cell and thus performs communication (NPL 1).

For example, a study has been conducted on a method in which both sides, the base station apparatus that constitutes the macro cell and the base station apparatus that constitutes the small cell are made to have dynamic resource allocation function, in dual connectivity that is used for connecting multiple base station apparatuses. Additionally, in order to efficiently perform communication with multiple base station apparatuses (the base station apparatus that constitutes the macro cell and the base station apparatus that constitutes the small cell), each of which has the dynamic resource allocation function, a study has been conducted on extension in the terminal device of a protocol for the terminal device in such a manner that every base station apparatus is equipped with functions of data link layers (an MAC layer, an RLC layer, a PDCP layer, and the like).

Furthermore, a study has been conducted on support of transmission and reception of a radio resource control message (an RRC message) in the terminal device only between the terminal device and the base station apparatus that constitutes the macro cell. Furthermore, a study has been conducted on the need in the terminal device of a random access procedure for the base station apparatus that constitutes the small cell in order to check for synchronization in a case where the base station apparatus that constitutes the small cell and the terminal device starts to communicate with each other.

NPL 2 discloses a random access procedure in a case where the terminal device to which the dual connectivity is applied starts to communicate with the base station apparatus that constitutes the small cell. NPL 2 discloses that while the generation of the RRC message as uplink data in the terminal device in the related art triggers the random access procedure, the generation of the RRC message in the terminal device to which the dual connectivity is applied does not start the random access procedure for the small cell.

That is, because the terminal device to which the dual connectivity is applied does not transmit a RRC message to the base station apparatus that constitutes the small cell, although the RRC message is generated as transmission data, a Buffer Status Report (BSR) is not triggered because the RRC message is not regarded as a transmission buffer for the small cell. As a result, it is disclosed that a random access procedure for a Scheduling Request is not started for the small cell.

CITATION LIST

Non Patent Literature

NPL 1: R2-140906 and NTT DOCOMO, INC., 3GPP TSG RAN2#85, Prague, Czech, Feb. 10-14, 2014. http://www.3gpp.org/ftp/tsg_ran/WG2_RL2/TSGR2_85/Docs/

NPL 2: R2-140246, Samsung, 3GPP TSG RAN2#85, Prague, Czech, Feb. 10-14, 2014. http://www.3gpp.org/ftp/tsg_ran/WG2_RL2/TSGR2_85/Docs/

DISCLOSURE OF THE INVENTION

Problems to be Solved by the Invention

In NPL 2, it is proposed that a random access procedure that results from a transmission buffer report (Regular BSR) is executed as starting of a random access procedure for the small cell, and as one example of a method for doing this, a method in which transmission data is transferred in advance on the small cell side is disclosed.

However, it is predicted that when the random access procedure starts by the occurrence of the transmission buffer on the small cell side, the following problems occur. For example, a problem with the terminal device is that the random access procedure is not started until the uplink data that has to be transmitted to the small cell occurs. This means that in the base station apparatus which constitutes the small cell, because a state where it is difficult to check whether or not the terminal device correctly completes a procedure for adding the small cell, that is, a state where the communication is difficult to start occurs, there is a likelihood that a radio resource will not be efficiently used.

Furthermore, in a case where a parameter indispensable for the random access procedure is allocated from the base station apparatus to the terminal device, there is another problem that a timing at which the random access procedure to which the parameter is applied starts is indefinite. This means that, although the terminal device is not needed, there is a likelihood that the allocation by the base station apparatus of the radio resource relating to the random access procedure will preclude the efficient use of the radio resource.

An object of the present invention is to deal with at least one of the problems described above by providing a technology associated with a terminal device, a base station apparatus, a communication system, a communication method, and an integrated circuit, in all of which efficient communication control is performed.

Means for Solving the Problems

In order to accomplish the object described above, the following means are contrived. That is, according to the present invention, there is provided a terminal device which makes a connection to a base station apparatus using a first cell group and second cell group, the terminal device starting counting of an RRC timer relating to a random access procedure for a cell in the second cell group and initiating the random access in a case where the second cell group that includes at least one cell is changed based on an information element which is notified with a radio resource control message that is received from the base station apparatus.

Furthermore, in a case where the random access procedure for the cell is successful, the terminal device according to the present invention stops the counting of the RRC timer, and applies a configuration relating to an uplink physical channel and an uplink physical signal for the cell.

Furthermore, the terminal device according to the present invention is the terminal device that, when notified information indicating that a problem with the random access procedure for the cell occurs, ends the random access procedure for the cell.

Furthermore, in a case where the RRC timer expires, the terminal device according to the present invention ends the random access procedure for the cell, in which the second cell group is a Secondary Cell Group that includes a primary secondary cell.

Furthermore, according to the present invention, there is provided a base station apparatus, which makes a connection to a terminal device that uses a first cell group and a second cell group, and which, in a configuration procedure for the second cell group for the terminal device, configures an information element that includes a configuration relating to random access to a cell in the second cell group, and a configuration relating to an RRC timer that is counted in a random access procedure for the cell in the second cell group, for a radio resource control message, transmits the radio resource control message to the terminal device, and causes the terminal device to execute the random access procedure for the cell in the second cell group.

Furthermore, the base station apparatus according to the present invention waits for a notification that the random access procedure which is executed for the cell in the Secondary Cell Group is successful, until the RRC timer expires.

Furthermore, in a case where a synchronization procedure for the cell in the second cell group is performed on the terminal device, the base station apparatus according to the present invention configures the information element including the configuration relating to the random access and the configuration relating to the RRC timer, for the radio resource control message, and transmits the radio resource control message with a cell in the first cell group.

Furthermore, according to the present invention, there is provided a communication system in which a terminal device and a base station apparatus make connections to each other using a first cell group and a second cell group, in which, in a configuration procedure for the second cell group for the terminal device, the base station apparatus configures an information element that includes a configuration relating to random access to a cell in the second cell group, and a configuration relating to an RRC timer that is counted in a random access procedure for the cell in the second cell group, for a radio resource control message, and transmits the radio resource control message to the terminal device, and in which, the terminal device receives the radio resource control message, and, in a case where the second cell group including at least one cell is changed based on the received radio resource control message, starts counting of an RRC timer relating to the random access procedure, and executes the random access procedure.

Furthermore, according to the present invention, there is provided a communication method for use in a terminal device that makes a connection to a base station apparatus using a first cell group and second cell group, the communication method at least including: a step of receiving a radio resource control message from the base station apparatus; and a step of starting counting of an RRC timer relating to a random access procedure for a cell in the second cell group, and of initiating the random access, in a case where the second cell group that includes at least the one cell is changed based on an information element which is notified with the radio resource control message.

Furthermore, according to the present invention, there is provided a communication method for use in a base station apparatus, the communication method at least including: a step of making a connection to a terminal device that uses a first cell group and a second cell group; a step of configuring an information element that includes a configuration relating to random access to a cell in the second cell group, and a configuration relating to an RRC timer that is counted in a random access procedure for the cell in the second cell group, for a radio resource control message, in a configuration procedure for the second cell group for the terminal device; and a step of transmitting the radio resource control message to the terminal device in order to causing the terminal device to execute the random access procedure for the cell in the second cell group, based on the information element.

Furthermore, according to the present invention, there is provided an integrated circuit that is built into a terminal device that makes a connection to a base station apparatus using a first cell group and second cell group, the integrated circuit causing the terminal device to at least perform: a function of receiving a radio resource control message from the base station apparatus; and a function of starting counting of an RRC timer relating to a random access procedure for a cell in the second cell group, and of initiating the random access, in a case where the second cell group that includes at least the one cell is changed based on an information element which is notified with the radio resource control message.

Furthermore, according to the present invention, there is provided an integrated circuit that is built into a base station apparatus, the integrated circuit causing the base station apparatus to at least perform: a function of making a connection to a terminal device that uses a first cell group and a second cell group; a function of configuring an information element that includes a configuration relating to random access to a cell in the second cell group, and a configuration relating to an RRC timer that is counted in a random access procedure for the cell in the second cell group, for a radio resource control message, in a configuration procedure for the second cell group for the terminal device; and a function of transmitting the radio resource control message to the terminal device in order to causing the terminal device to execute the random access procedure for the cell in the second cell group, based on the information element.

In the present specification, each embodiment is disclosed in terms of the technology associated with the terminal device, the base station apparatus, the communication system, the control method, and the integrated circuit, in all of which the efficient communication control is performed, but a communication scheme that is applicable to each embodiment is not limited to EUTRA or a communication scheme compatible with EUTRA, such as Advanced EUTRA.

For example, the technology that is described in the present specification can be used in various communication systems that use Code Division Multiple Access (CDMA), Time Division Multiple Access (TDMA), Frequency Division Multiplex Access (FDMA), orthogonal FDMA (OFDMA), single carrier FDMA (SC-FDMA), and other access schemes. Furthermore, in the present specification, the system and the network can be used synonymously.

Effects of the Invention

According to the present invention, a technology can be provided that is associated with a terminal device, a base station apparatus, a communication system, a communication method, and an integrated circuit, in all of which efficient communication control is performed.

MODE FOR CARRYING OUT THE INVENTION

Figure 1:
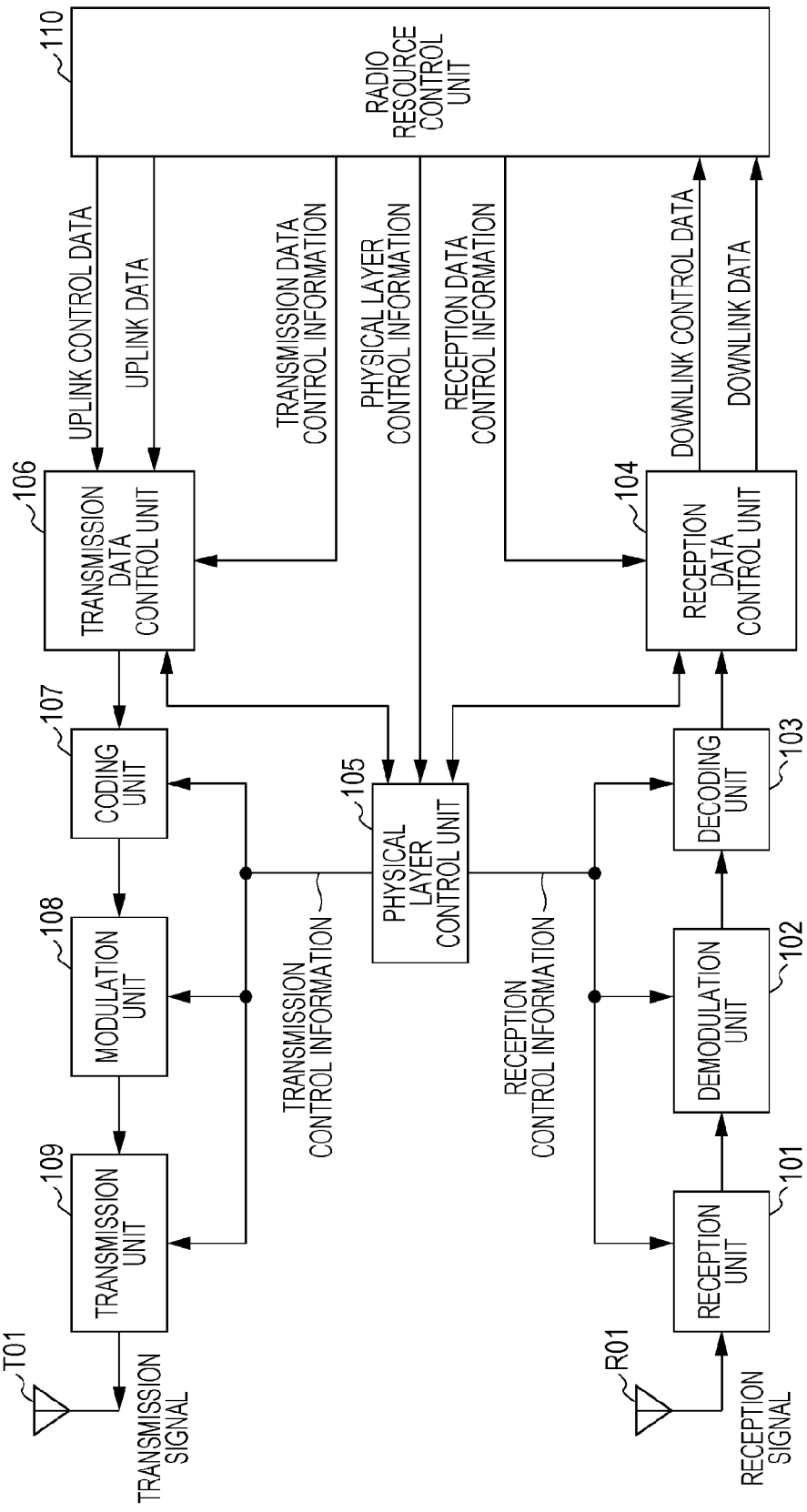
FIG. 1 is a block diagram illustrating one example of a schematic constitution of a terminal device according to an embodiment of the present invention.

A technology associated with each embodiment of the present invention will be described briefly below.

[Physical Channel/Physical Signal]

Physical channels and physical signals that are mainly used for EUTRA and Advanced EUTRA are described. A channel means a medium that is used for signal transmission and reception, and a physical channel means a physical medium that is used for the signal transmission and reception. According to the present invention, the physical channel and the signal can be used synonymously. There is a likelihood that in EUTRA and Advanced EUTRA, the physical channel will be added in future or an architecture or format type thereof will be changed or added, but this change or addition does not have any influence on a description of each embodiment of the present invention.

In EUTRA and Advanced EUTRA, scheduling of the physical channel or the physical signal is managed using a radio frame. One radio frame is 10 ms, and one radio frame is constituted from 10 subframes. In addition, one subframe is constituted from two slots (that is, one subframe is 1 ms and one slot is 0.5 ms). Furthermore, management is performed using a resource block as a minimum unit for scheduling for allocating the physical channel. The resource block is defined by a fixed frequency domain that is constituted from a set of multiple subcarriers (for example, 12 subcarriers) along a frequency axis and by a domain that is constituted from a fixed transmission time interval (1 slot).

A synchronization signal is constituted from 3 types of primary synchronization signals and a secondary synchronization signal that is constituted from 31 types of codes which are interleaved in the frequency domain. With a combination of these signals, the primary synchronization signal and the secondary synchronization signal, 504 cell identifiers (Physical Cell Identity (PCI)) for identifying a base station apparatus and a frame timing for wireless synchronization are indicated. A terminal device specifies the physical cell ID of the synchronization signal that is received through cell search.

A Physical Broadcast Channel (PBCH) is transmitted for the purpose of notifying (configuring) a control parameter (broadcast information (system information)) that is used in a shared manner in terminal devices within a cell. When it comes to the broadcast information that is not notified on the Physical Broadcast Channel, a radio resource with which the broadcast information is transmitted on a Physical Downlink Control Channel is notified to the terminal device within the cell, and with the notified radio resource, a layer 3 message (system information) that notifies the broadcast information using a Physical Downlink Shared Channel is transmitted.

As pieces of broadcast information, a Cell Global Identifier (CGI) indicating a cell-dedicated identifier, a Tracking Area Identifier (TAI) for managing a waiting area by paging, random access configuration information, transmission timing adjustment information, shared radio resource configuration information in the cell, neighboring cell information, uplink access limitation information, and the like are notified.

Downlink reference signals are categorized by their usage into multiple types. For example, a cell-specific reference signal (RS) is a pilot signal that is transmitted with a prescribed power for every cell, and is a downlink reference signal that is periodically iterated in the frequency domain and the time domain based on a prescribed rule. The terminal device measures reception quality for every cell by receiving the cell-specific RS. Furthermore, the terminal device uses the cell-specific RS also as a reference signal for demodulation of the Physical Downlink Control Channel that is transmitted together with the cell-specific RS, or of the Physical Downlink Shared Channel. As a sequence that is used for the cell-specific RS, a sequence that is identifiable for every cell is used.

Furthermore, the downlink reference signal is also used for estimation of propagation fluctuation in downlink. The downlink reference signal that is used for the estimation of the propagation fluctuation is referred to as a Channel State Information Reference Signal (CSI-RS). Furthermore, the downlink reference signal that is configured, in a dedicated manner, for the terminal device is referred to as UE-specific Reference Signals (URS), Demodulation Reference Signal (DMRS), or Dedicated RS (DRS), and is referred to for channel compensation processing of the channel that is to be performed when demodulating the Physical Downlink Control Channel, Enhanced Physical Downlink Control Channel, or the Physical Downlink Shared Channel.

The Physical Downlink Control Channel (PDCCH) is transmitted in several OFDM symbols (for example, 1 to 4 OFDM symbols) starting from the head of each subframe. The Enhanced Physical Downlink Control Channel (EPDCCH) is a Physical Downlink Control Channel that is allocated to the OFDM symbols to which the Physical Downlink Shared Channel (PDSCH) is allocated. The PDCCH or the EPDCCH is used for the purpose of notifying radio resource allocation information in accordance with the scheduling of the terminal device by the base station apparatus, or information indicating an amount of adjustment for an increase or decrease in transmit power. Unless otherwise specified, the Physical Downlink Control Channel (PDCCH) that will be described simply below means both of the physical channels, the PDCCH and the EPDCCH.

The terminal device monitors the Physical Downlink Control Channel that is destined for the terminal device itself before transmitting and receiving a layer 2 message and the layer 3 message (paging, a handover command, or the like) that are downlink data or downlink control data, and receives the Physical Downlink Control Channel that is destined for the terminal device itself. Thus, the terminal device needs to acquire from the Physical Downlink Control Channel the radio resource allocation information that is referred to as an uplink grant at the time of the transmission and as a downlink grant (a downlink assignment) at the time of the reception. Moreover, in addition to being transmitted in the OFDM symbol described above, it is possible that the Physical Downlink Control Channel is also constituted to be transmitted in a region of the resource block that is allocated in a dedicated manner from the base station apparatus to the terminal device.

A Physical Uplink Control Channel (PUCCH) is used for an acknowledgement response (Acknowledgement/Negative Acknowledgement (ACK/NACK)) for reception of the downlink data that is transmitted on the Physical Downlink Shared Channel, for downlink channel (channel state) information (Channel State Information (CSI)), or for making an uplink radio resource allocation request (a radio resource request or a Scheduling Request (SR)).

Pieces of CSI include a Channel Quality Indicator (CQI), a Precoding Matrix Indicator (PMI), a Precoding Type Indicator (PTI), and a Rank Indicator (RI). Each indicator may be expressed as indication.

The Physical Downlink Shared Channel (PDSCH) is also used for notifying the terminal device of the broadcast information (system information) that is not notified, as the layer 3 message, by paging or on the Physical Broadcast Channel, as well as the downlink data. The radio resource allocation information of the Physical Downlink Shared Channel is indicated with the Physical Downlink Control Channel. The Physical Downlink Shared Channel is transmitted in a state of being allocated to OFDM symbols other than the OFDM symbols in which the Physical Downlink Control Channel is transmitted. That is, the Physical Downlink Shared Channel and the Physical Downlink Control Channel are time-multiplexed within one subframe.

It is possible that uplink data and uplink control data are mainly transmitted on a Physical Uplink Shared Channel (PUSCH), and the PUSCH includes control data, such as the CSI or the ACK/NACK. Furthermore, the PUSCH is also used for the terminal device to notify the base station apparatus of uplink control information as the layer 2 message and the layer 3 message, in addition to the uplink data. Furthermore, as is the case in the downlink, the radio resource allocation information of the Physical Uplink Shared Channel is indicated with the Physical Downlink Control Channel.

Included in an Uplink Reference Signal (which is also referred to as an uplink pilot signal or an uplink pilot channel) are a Demodulation Reference Signal (DMRS) that is used for the base station apparatus to demodulate the Physical Uplink Control Channel (PUCCH) and/or the Physical Uplink Shared Channel (PUSCH) and a Sounding Reference Signal (SRS) that is used for the base station apparatus to mainly estimate an uplink channel state. Furthermore, as the Sounding Reference Signals, there are a periodic Sounding Reference Signal (Periodic SRS) that is periodically transmitted and an aperiodic Sounding Reference Signal (Aperiodic SRS) that is transmitted when there is an instruction to transmit the Aperiodic SRS from the base station apparatus.

A Physical Random Access Channel (PRACH) is a channel that is used for notifying (configuring) a preamble sequence and has a guard time. The preamble sequence is constituted in such a manner that information is notified to the base station apparatus with multiple sequences. For example, in a case where 64 types of sequences are prepared, 6-bit information can be indicated to the base station apparatus. The Physical Random Access Channel is used as means by which the terminal device has access to the base station apparatus.

The terminal device uses the Physical Random Access Channel in order to make the radio resource request in uplink when the Physical Uplink Control Channel is not configured, to make a request to the base station apparatus for the transmission timing adjustment information (which is also referred to as timing advance (TA)) indispensable for adjusting an uplink transmission timing to a reception timing window of the base station apparatus, or to perform an operation like this. Furthermore, the base station apparatus can also make a request to the terminal device for starting of a random access procedure using the Physical Downlink Control Channel.

The layer 3 message is a message that is handled with a protocol of a control-plane (C-Plane) (CP) that is exchanged in radio resource control (RRC) layers of the terminal device and the base station apparatus. RRC signaling or an RRC message can be used synonymously. Moreover, in contrast with the control-plane, a plane for a protocol that is used to handle user data is referred to as a user-plane (U-Plane) (UP).

Moreover, detailed descriptions of physical channels or physical signals other than these are omitted because they have no relationship with each embodiment of the present invention. As physical channels or physical signals of which the descriptions are omitted, there are a physical control format indicator channel (PCFICH), a physical hybrid ARQ indicator channel (PHICH), a physical multicast channel (PMCH) and the like.

[Wireless Network and Cell Type]

A range (a communication area) in which each frequency is available for communication, which is controlled by the base station apparatus, is regarded as a cell. At this time, the communication area that is covered by the base station apparatus may vary in size and shape from one frequency to another. Furthermore, the area that is covered may vary from one frequency to another. When cells that are covered by different types of base station apparatuses or that have different radii are present in a mixed manner in an area where the same frequency or different frequencies are available and one communication system is formed, this wireless network is referred to as a heterogeneous network.

In a case where downlink in a cell is of reception quality suitable for communication, the terminal device may regard such a cell as a communication area (in-coverage). When the terminal device moves from a serving cell to a different cell, the terminal device moves to a separate suitable cell by a cell re-selection procedure while in a non-wireless resource connection state (in an idle state or during non-communication) and by a handover procedure at the time of a wireless resource connection (in a connection state or during communication). The suitable cell indicates a cell in which it is determined that, generally, the access by the terminal device is not disallowed based on information that is designated from the base station apparatus, and in which the reception quality of the downlink satisfies a prescribed condition.

The base station apparatus manages one or more cells that are areas where it is possible that the terminal device performs communication, from one frequency to another. One base station apparatus manages multiple cells. Cells are categorized into multiple types according to the size (cell size) of an area where communication with the terminal device is possible. For example, cells are categorized into macro cells and small cells. Generally, the small cell is a cell that has a coverage area with a radius of several meters to several-ten meters. Furthermore, the small cells are categorized into femto cells, pico cells, nano cells, and the like according to their coverage areas.

When the terminal device is able to communicate with a certain base station, among cells that are covered by the certain base station apparatus, a cell that is configured in such a manner that the cell is used for communication with the terminal device is referred to as a serving cell, and the other cells that are not used for the communication are referred to as neighboring cells.

Furthermore, a technology in which frequencies (component carriers or frequency bands) in multiple different frequency bands are aggregated by carrier aggregation and are handled as if they were one frequency (frequency band) may be applied to the terminal device and the base station apparatus. In the carrier aggregation, as the component carriers, there are an uplink component carrier that corresponds to the uplink and a downlink component carrier that corresponds to the downlink. In the present specification, the frequency and the frequency band can be used synonymously.

For example, in a case where a frequency bandwidth is obtained by aggregating five 20 MHz component carriers, the terminal device that has the capability for the carrier aggregation performs transmission and reception, regarding these as a 100 MHz frequency bandwidth. Moreover, although the component carries to be aggregated are contiguous frequencies, some or all of the component carriers may be non-contiguous frequencies. For example, available frequency bands are an 800 MHz band, 2 GHz band, and a 3.5 GHz band, one component carrier may be transmitted in the 800 MHz band, another component in the 2 GHz band, and a third component in the 3.5 GHz band.

Furthermore, it is possible that the terminal device and the base station apparatus also aggregate multiple contiguous or non-contiguous component carriers in the same frequency band. A frequency bandwidth of each component carrier may be a frequency bandwidth (for example, 5 MHz or 10 MHz) narrower than a frequency bandwidth (for example, 20 MHz) in which the terminal device is capable of performing reception, and the frequency bandwidths to be aggregated may be different from each other. It is desirable that a frequency bandwidth is equal to any one of the frequency bandwidths in a cell in the related art, considering backward compatibility, but a frequency bandwidth may be used that is different from the frequency bandwidth in the cell in the related art.

With the carrier aggregation, component carriers (career types) may be aggregated that do not have the backward compatibility. The component carrier that does not have the backward compatibility is also referred to as a new component type (NCT). Furthermore, component carriers in frequency bands in different communication schemes, for example, FDD and TDD, may be aggregated. Moreover, it is desirable that the number of uplink component carriers that are allocated to (configured for or added to) the terminal device by the base station apparatus is equal to or smaller than the number of downlink component carriers.

The terminal device and the base station apparatus manage as a primary cell (PCell) a cell that is constituted from a certain uplink component carrier and a downlink component carrier which is connected, in a cell-specific manner, to the certain uplink component carrier. Furthermore, the terminal device and the base station apparatus manage as a secondary cell (SCell) a cell that is constituted from component carriers other than those from which the primary cell is constituted.

The terminal device may perform reception of a paging message, detection of update of the broadcast information, an initial access procedure, configuration of security information, and the like in the primary cell, and on the other hand, may not perform these operations in the secondary cell. The primary cell and the secondary cell are collectively referred to as a serving cell.

The primary cell is other than a target for control of activation and deactivation (more precisely, the primary cell is regarded as being necessarily activated), but the secondary cell retains a state of the cell, in accordance with activities, that is, the activation and the deactivation. With regard to the state of the cell, a state where the serving cell is activated is also referred to as an activated state, and a state where the serving cell is deactivated is also referred to as a deactivated state. When it comes to the state of the cell (the secondary cell), there are also a case where a change of the state is explicitly designated (notified or indicated) by the base station apparatus, and a case where the state is changed based on timer information (a secondary cell deactivation timer (a deactivation timer)) that is counted by the terminal device for every component carrier (secondary cell).

The control relating to the activation and/or deactivation of the secondary cell is described. The base station apparatus notifies the terminal device of a command indicating the activation and/or deactivation of the secondary cell. The command is transmitted, as a MAC control element (MAC-CE) that is included in a MAC protocol data unit (PDU) which is decoded (encoded) with the MAC layer, to the terminal device.

Moreover, the carrier aggregation is for communication in multiple cells that uses multiple component carriers (frequency bands), and is also referred to as cell aggregation. Moreover, the terminal device may be wirelessly connected to the base station apparatus through a relay station apparatus (or a repeater) at every frequency. That is, the base station apparatus according to each embodiment of the present invention can also be replaced with the relay station apparatus.

[Dual Connectivity]

Figure 7:
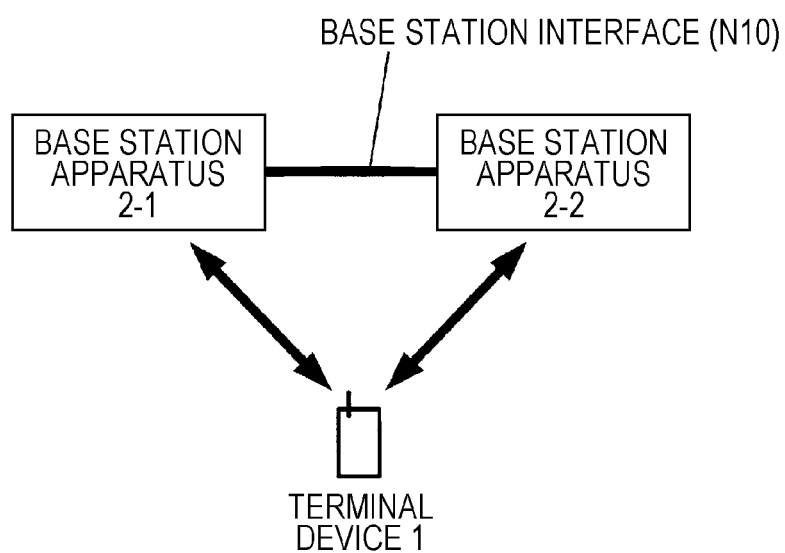
FIG. 7 is a diagram for describing a basic architecture of dual connectivity.

A basic architecture of dual connectivity is described referring to FIG. 7. FIG. 7 illustrates that the terminal device 1 makes connections to multiple base station apparatuses 2 (for example, a base station apparatus 2-1 and a base station apparatus 2-2 in the drawings). The base station apparatus 2-1 is assumed to be a base station apparatus that constitutes at least one macro cell, and the base station apparatus 2-2 is assumed to be a base station apparatus that constitutes at least one small cell.

In FIG. 7, the base station apparatus 2-1 or the base station apparatus 2-2 is connected to a Mobility Management Entity (MME) and a Serving Gateway (SGW) with a backbone line. The MME is among control station apparatuses on a core network, and assumes the role of performing mobility management or authentication control (security control) of the terminal device 1 and configuring a user data path to the base station apparatus 2, and the like. The SGW is among the control station apparatuses on the core network, and assumes the role of transferring user data along the user data path to the terminal device 1 that is configured by the MME, and the like.

Furthermore, a connection path between the base station apparatus 2-1 or the base station apparatus 2-2, and the SGW is referred to as an S1-U interface. A connection path between the base station apparatus 2-1 and the MME is referred to as an S1-MME interface. A connection path (a base station interface N10) between the base station apparatus 2-1 and the base station apparatus 2-2 is also referred to as an X2 interface in EUTRA. In the dual connectivity, a connection path between the MME and the terminal device 1 through the base station apparatus 2-2 is not configured.

A first base station apparatus (the base station apparatus 2-1) that is connected to the MME is also referred to as a master base station apparatus (Master eNB), and a second base station apparatus (the base station apparatus 2-2) that is not used for communication with the master base station apparatus, but used for communication with the terminal device 1 is also referred to as a secondary base station apparatus (Secondary eNB). A group of cells that are used for connection between the terminal device 1 and the master base station apparatus is also referred to as a Master Cell Group (MCG), and a group of cells that are used for connection between the terminal device 1 and the secondary base station apparatus is also referred to as a Secondary Cell Group (SCG).

Furthermore, a cell that belongs to the MCG is also referred to as an MCG cell, and a cell that belongs to the SCG is also referred to as an SCG cell. Furthermore, with respect to the SCG cell, among the SCG cells, a special SCG for which the Physical Uplink Control Channel (PUCCH) is configured and which serves the role similar to the role of the primary cell is referred to as a primary secondary cell (Primary SCell (PScell) or a special secondary cell).

For example, the primary secondary cell is a cell which, like the primary cell, is not deactivated, and for which configuration of the Physical Uplink Control Channel is performed or for which a content-based random access procedure is executed. Moreover, like the primary cell or the secondary cell, the primary secondary cell is regarded as a serving cell.

An connection in which, in this manner, the terminal device 1 makes connections at the same time using multiple cells that belong to the multiple base station apparatus 2 is referred to as the dual connectivity, and the connection between the terminal device 1 and the multiple base station apparatuses 2 using a technology for realizing the dual connectivity is described using the expressions "using the dual connectivity", and "connection with the dual connectivity" or expressions having the same meaning as the expressions described above. The cells that belong to each base station apparatus 2 may be managed with the same frequency, and may be managed with different frequencies.

Moreover, the carrier aggregation is different from the connection using at least the dual connectivity in that one base station apparatus 2 manages multiple cells and in that a high-speed backbone line in which there is no need to consider an influence of delay is present between the multiple cells. In other words, the carrier aggregation is a technology that connects one terminal device 1 and one base station apparatus 2 through multiple cells, and in contrast with this, the dual connectivity is a technology that connects one terminal device 1 and multiple base station apparatus 2 through the cell that belongs to each of the multiple base station apparatus 2.

The terminal device 1 and the base station apparatus 2 can apply the technology that is applied to the carrier aggregation to the dual connectivity. For example, the terminal device 1 and the base station apparatus 2 may apply technologies, such as management (addition, deletion, change, and the like) of the primary cell and the secondary cell, configuration of a measurement method and a measurement event that correspond to the carrier aggregation, and activation/inactivation, to a cell that is connected using the dual connectivity.

Although the present technology is referred to as the term dual connectivity, this does not mean that the number of the base station apparatuses 2 that are connected to the terminal device 1 is limited to 2, and it is possible that the terminal device 1 also make connections to three or more base station apparatuses 2.

[Buffer Status Report]

An MAC layer of the terminal device retains a function of notifying (performing reporting to) the base station apparatus using an amount of data in a transmission buffer that corresponds to a logical channel. This function is referred to as a Buffer Status Report (BSR). The BSR, for example, is triggered with the MAC layer in each of (1) a case where uplink data available for transmission occurs at a higher layer (the RLC layer or the PDCP layer), and a priority level of a logical channel relating to the uplink data is higher than a priority level of data within the transmission buffer, or uplink data available for transmission to elsewhere is not present, (2) a case where a retransmission timer relating to the BSR expires, (3) a case where a periodic timer relating to the BSR expires, and (4) a case where a padding bits (padding area) that are greater in size than an MAC control element of the BSR.

In a case where any condition for triggering the BSR is satisfied, and in a case where a radio resource (new transmission of the Physical Uplink Shared Channel (PUSCH)) for notifying the BSR on a certain subframe is not allocated, if the Physical Uplink Control Channel (PUCCH) is allocated (is enabled), the MAC layer instructs a PHY layer to transmit a Scheduling Request using the Physical Uplink Control Channel (PUCCH).

Alternatively, if the Physical Uplink Control Channel (PUCCH) for the transmission of the Scheduling Request is not allocated (not enabled), the MAC layer starts a random access procedure for the Scheduling Request, and instructs the PHY layer to perform the transmission of the Physical Random Access Channel (PRACH). Moreover, the MAC layer keeps the BSR maintained in a state where the BSR is being triggered, until the radio resource is allocated. The triggered BSR is canceled in a case where the BSR is transmitted to the base station apparatus.

The BSRs are categorized, by the condition for trigging the BSR, into a Regular BSR, a Periodic BSR, and a Padding BSR. The BSR that is triggered by satisfying the conditions (1) and (2) described above is the Regular BSR. The BSR that is triggered by satisfying the condition (3) described above is the Periodic BSR. The BSR that is triggered by satisfying the condition (4) described above is the Padding BSR.

The BSR is reported using the MAC control element. As formats (bit structures) of the MAC control element in which the BSR is reported, there are a Short BSR in which a buffer status of one logical channel group is reported, and a Long BSR in which a buffer status of multiple logical channel groups is reported. Furthermore, with regard to the Padding BSR, in a case where the padding area sufficient to transmit the Long BSR is not present, a Truncated BSR that is a format for transmitting the BSR for the logical channel that has the highest priority level is used.

Moreover, the term "connection" that is used in each embodiment is not limited only to the constitution in which a certain device or apparatus and another device or apparatus are connected directly to each other using a physical line, and includes the meaning of a constitution in which a connection is made logically, a constitution in which a wireless connection is made using a wireless technology, or a constitution in which a connection is made via (through the relaying by) one or multiple devices or apparatuses.

Suitable embodiments of the present invention will be described in detail below considering the matters described above and referring to the accompanying drawings. Moreover, when the embodiments of the present invention are described, in a case where it is determined that a specific description of a known function or constitution associated with the embodiment of the present invention makes the gist of the embodiment of the present invention indefinite, a detailed description thereof is omitted.

First Embodiment

A first embodiment of the present invention will be described in detail below.

FIG. 1 is a block diagram illustrating one example of a terminal device 1 according to the first embodiment of the present invention. The present terminal device 1 is constituted at least from a reception unit 101, a demodulation unit 102, a decoding unit 103, a reception data control unit 104, a physical layer control unit 105, a transmission data control unit 106, a coding unit 107, a modulation unit 108, a transmission unit 109, and a radio resource control unit 110. The "units" in the drawings are elements that are expressed, also with the terms circuit, constituent element, device, unit, and the like and that realize a function of the terminal device 1 and each procedure.

The radio resource control unit 110 is a block that performs each function of the Radio Resource Control (RRC) layer that executes radio resource control of the terminal device 1. Furthermore, the reception data control unit 104 and the transmission data control unit 106 are blocks that perform each function in a Medium Access Control (MAC) layer that manages a data link layer, a Radio Link Control (RLC) layer, and a Packet Data Convergence Protocol (PDCP) layer.

Moreover, the terminal device 1 may be constituted from multiple blocks (the reception unit 101, the demodulation unit 102, and the decoding unit 103) in a reception system and multiples blocks (the coding unit 107, the modulation unit 108, and the transmission unit 109) in a transmission system, in order that, by using the carrier aggregation and/or the dual connectivity, multiple frequencies (frequency bands or frequency bandwidth) or reception processing within the same subframe of the cell can be supported in the reception system and multiple frequencies (frequency bands or frequency bandwidth) or transmission processing with the same subframe of the cell can be supported in the transmission system.

Furthermore, the terminal device 1 may be constituted in such a manner that it is possible that terminal device 1 includes multiple reception data control units 104, multiple physical layer control units 105, multiple transmission data control units 106, and multiple radio resource control units 110, for every corresponding base station apparatus. That is, the terminal device 1 may be constituted to include a physical layer, an MAC layer, an RLC layer, and a PDCP layer that correspond to the primary base station apparatus, and a physical layer, an MAC layer, an RLC layer, and a PDCP layer that correspond to the master base station apparatus. However, it is desirable that in this case, one RRC layer is also included in the terminal device 1.

With regard to the reception processing by the terminal device 1, reception data control information is input from the radio resource control unit 110 into the reception data control unit 104, and physical layer control information that is a control parameter for controlling each block is input into the physical layer control unit 105. The physical layer control information is information that is constituted from reception control information and transmission control information and that includes a parameter configuration indispensable for wireless communication control by the terminal device 1.

The physical layer control information is configured by a wireless connection resource configuration that is transmitted in a dedicated manner from the base station apparatus 2 to the terminal device 1, cell-specific broadcast information, a system parameter, or the like, and, if need arises, is input by the radio resource control unit 110 into the physical layer control unit 105. The physical layer control unit 105 suitably inputs the reception control information, which is control information relating to the reception, to the reception unit 101, the demodulation unit 102, and the decoding unit 103.

Included in the reception control information are pieces of information, as downlink scheduling information, such as reception frequency band information, reception timing relating to the physical channel and the physical signal, a multiplexing method, and radio resource control information. Furthermore, the reception data control information is downlink control information that includes secondary cell deactivation timer information, DRX control information, multicast data reception information, downlink retransmission control information, and the like. Additionally, control information relating to the downlink in each of the MAC layer, the RLC layer, and the PDCP layer is included in the reception data control information.

The reception signal is received in the reception unit 101. The reception unit 101 receives a signal from the base station apparatus 2 in accordance with the frequency and the frequency band that are notified with the reception control information. The signal that is received is input into the demodulation unit 102. The demodulation unit 102 performs demodulation of the signal. The demodulation unit 102 inputs a post-demodulation signal into the decoding unit 103. The decoding unit 103 decodes the signal that is input, and inputs each piece of data (which is also referred to as downlink data, downlink control data, or a downlink transport block) that results from the decoding, into the reception data control unit 104. Furthermore, as well as each piece of data, the MAC control element that is transmitted from the base station apparatus 2 is decoded in the decoding unit 103, and related data is input into the reception data control unit 104.

The reception data control unit 104 performs control (for example, cell activation/deactivation, DRX control, transmission timing adjustment, and the like) of the physical layer control unit 105, which is based on the received MAC control element, performs buffering of each piece of data that results from the decoding, and performs error correction control (HARQ) of data that is retransmitted. Each piece of data that is input into the reception data control unit 104, that is, related data is input into (transferred to) the radio resource control unit 110.

With regard to the transmission processing by the terminal device 1, transmission data control information is input from the radio resource control unit 110 into the transmission data control unit 106, and the physical layer control information that is a control parameter for controlling each block is input into the physical layer control unit 105. The physical layer control unit 105 suitably inputs the transmission control information that is control information relating to the transmission, into the coding unit 107, the modulation unit 108, and the transmission unit 109. Included in the transmission control information are pieces of information, as uplink scheduling information, such as coding information, modulation information, transmission frequency band information, transmission timing relating to the physical channel and the physical signal, the multiplexing method, and the radio resource arrangement information.

Furthermore, the transmission data control information is uplink control information that includes DTX control information, the random access configuration information, uplink shared channel information, logical channel priority information, resource request configuration information, cell group information, uplink retransmission control information, power headroom report information, and the like. The radio resource control unit 110 may configure multiple pieces of random access configuration information that correspond to multiple cells, respectively, for the transmission data control unit 106.

Furthermore, the transmission data control information may include information for the transmission data control unit 106 to determine (making a decision on and controlling) whether or not an uplink synchronization procedure is indispensable for the changed cell (cell group), as well as information for changing (adding and updating) a cell constitution that is configured for the terminal device 1.

Furthermore, the radio resource control unit 110 manages the transmission timing adjustment information and the transmission timing timer that are used for adjustment of the uplink transmission timing, and manages an uplink transmission timing state (a transmission timing adjusted state or a transmission timing non-adjusted state) for every cell (every cell group or every TA group). The transmission timing adjustment information and the transmission timing timer are included in the transmission data control information.

Moreover, in a case where there is a need to manage multiple uplink transmission timing states, the transmission data control unit 106 manages the transmission timing adjustment information that corresponds to the uplink transmission timing in each of the multiple cells (the cell group or the TA group). Included in the resource request configuration information are at least maximum transmission counter configuration information and radio resource request prohibition timer information. The radio resource control unit 110 may configure multiple pieces of resource request configuration information that correspond to multiple cells, respectively, for the transmission data control unit 106.

The transmission data (which is also referred to as the uplink data and/or uplink control data, or an uplink transport block) available for transmission, which is originated in the terminal device 1, is input from the radio resource control unit 110 into the transmission data control unit 106 at an arbitrary timing. When the transmission data is input, the transmission data control unit 106 stores the transmission data in an uplink buffer (not illustrated) within the transmission data control unit 106. At this time, the transmission data control unit 106 calculates an amount of transmission data (an amount of uplink buffer) that is input. Furthermore, the transmission data control unit 106 may have a function of determining from the logical channel whether the transmission data that is input is data that belongs to the control-plane or is data that belongs to the user-plane.

The transmission data control unit 106 determines whether the triggering condition relating to the Buffer Status Report is satisfied, and in a case where the Buffer Status Report is triggered, generates the MAC control element that is used for the Buffer Status Report. Then, the transmission data control unit 106 determines whether or not the radio resource indispensable for the transmission of the transmission data that is input is allocated to the terminal device 1.

The transmission data control unit 106 selects any one of the radio resource request that uses the Physical Uplink Shared Channel (PUSCH) and the Physical Uplink Control Channel (SR-PUCCH) and the radio resource request that uses the Physical Random Access Channel, based on whether the Scheduling Request is triggered and on radio resource allocation, and makes a request to the physical layer control unit 105 for control processing for transmitting the selected channel.

Furthermore, in accordance with the transmission control information, the coding unit 107 suitably codes each piece of data and inputs a result of the coding into the modulation unit 108.

Based on a channel structure in which each piece of coded data is transmitted, the modulation unit 108 performs suitable modulation processing. As well as mapping each piece of data being modification-processed to the frequency domain, the transmission unit 109 converts a signal in the frequency domain into a signal in the time domain, superimposes the resulting signal on a carrier wave in a fixed frequency, and performs power amplification. In accordance with the transmission timing adjustment information for every cell (every cell group or every TA group), which is input from the radio resource control unit 110, the transmission unit 109 further adjusts the uplink transmission timing. It is possible that the Physical Uplink Shared Channel to which the uplink control data is mapped also includes, for example, the layer 3 message (a radio resource control message or the RRC message) in addition to the user data.

Other constituent elements of the terminal device 1 and a transfer path for data (the control information) between the constituent elements are omitted in FIG. 1, but it is apparent that multiple blocks that have other functions indispensable for the terminal device 1 to operate are retained as constituent elements. For example, a NAS layer unit that, along with a core network, executes control, or an application layer unit is present above the radio resource control unit 110.

Figure 2:
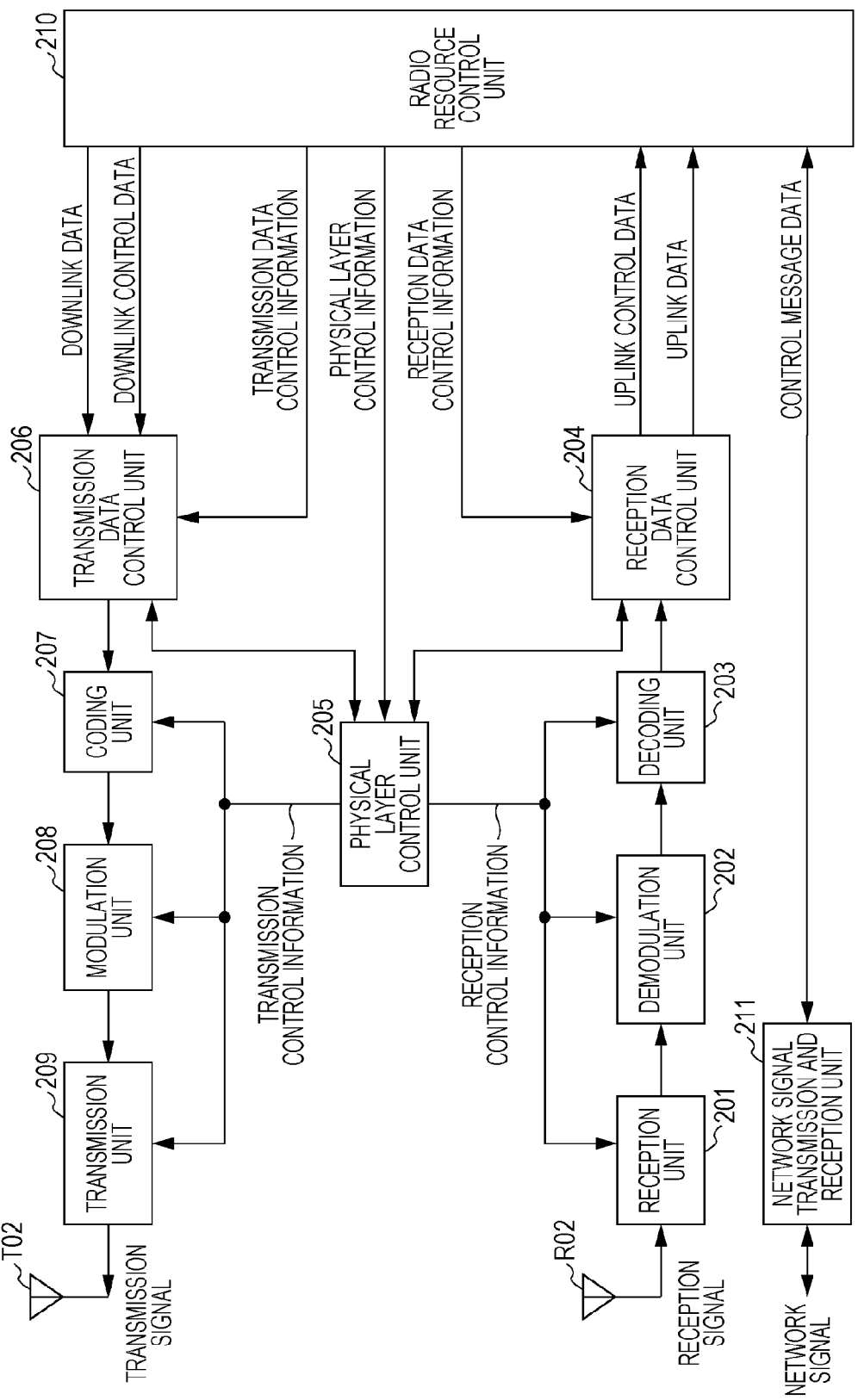
FIG. 2 is a block diagram illustrating one example of a schematic constitution of a base station apparatus according to the embodiment of the present invention.

FIG. 2 is a block diagram illustrating one example of a base station apparatus 2 according to the first embodiment of the present invention. The present base station apparatus is constituted at least from a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, and a network signal transmission and reception unit 211. The "units" in the drawings are elements that are expressed, also with the terms circuit, constituent element, device, unit, and the like and that perform a function of the base station apparatus 2 and execute each procedure.

The radio resource control unit 210 is a block that performs each function of the Radio Resource Control (RRC) layer that executes the radio resource control of the base station apparatus 2. Furthermore, the reception data control unit 204 and the transmission data control unit 206 are blocks that perform each function in the Medium Access Control (MAC) layer that manages the data link layer, the Radio Link Control (RLC) layer, and the Packet Data Convergence Protocol (PDCP) layer.

Moreover, the base station apparatus 2 may be constituted from multiple blocks (the reception unit 201, the demodulation unit 202, and the decoding unit 203) in the reception system and multiples blocks (the coding unit 207, the modulation unit 208, and the transmission unit 209) in the transmission system, in order that, by using the carrier aggregation and/or the dual connectivity, multiple frequencies (frequency bands or frequency bandwidth) are supported. Furthermore, the base station apparatus 2 may include multiple reception data control units 204, multiple physical layer control units 205, multiple transmission data control units 206, multiple radio resource control unit 210, and multiple network signal transmission and reception unit 211.

The radio resource control unit 210 inputs the downlink data and the downlink control data into the transmission data control unit 206. In a case where the MAC control element that is to be transmitted to the terminal device 1 is present, the transmission data control unit 206 inputs the MAC control element and each piece of data (the downlink data or the downlink control data) into the coding unit 207. The coding unit 207 codes the MAC control element and each piece of data, which are input, and inputs results of the coding into the modulation unit 208. The modulation unit 208 performs modulation of the coded signal.

Furthermore, the signal that is modulated in the modulation unit 208 is input into the transmission unit 209. After mapping each piece of data being input to the frequency domain, the transmission unit 209 converts a signal in the frequency domain into a signal in the time domain, superimposes the resulting signal on a carrier wave in the fixed frequency, performs the power amplification, and performs the transmission. The Physical Downlink Shared Channel to which the downlink control data is mapped typically constitutes the layer 3 message (the RRC message).

Furthermore, the reception unit 201 converts the signal that is received from the terminal device 1 into a digital signal in a baseband. In a case where cells at multiple different transmission timings are configured for the terminal device 1, the reception unit 201 receives the signal at different timings for every cell (every cell group or every TA group). The digital signal that results from the conversion in the reception unit 201 is input into the demodulation unit 202 and is demodulated. The signal that results from the demodulation in the demodulation unit 202 is subsequently input into the decoding unit 203. The decoding unit 203 decodes the signal that is input, and inputs each piece of data (the uplink data and the uplink control data) that results from the decoding, into the reception data control unit 204. Furthermore, as well as each piece of data, the MAC control element that is transmitted from the terminal device 1 is decoded in the decoding unit 203, and related data is input into the reception data control unit 204.

The reception data control unit 204 performs control (for example, control relating to the power headroom report, control relating to the Buffer Status Report, or the like) of the physical layer control unit 205, which is based on the received MAC control element, performs buffering of each piece of data that results from the decoding, and performs the error correction control (HARQ) of data that is retransmitted. Each piece of data that is input into the reception data control unit 204, that is, related data is input into (transferred to) the radio resource control unit 210.

The physical layer control information that is indispensable for these type of control of each block is information that is constituted from reception control information and transmission control information and that includes a parameter configuration indispensable for wireless communication control by the base station apparatus 2. The physical layer control information is configured by the higher-level network apparatus (an MME, a gateway apparatus (SGW), an OAM, or the like) or the system parameter, and, if need arises, is input by the radio resource control unit 210 into the control unit 204.

The physical layer control unit 205 inputs the physical layer control information associated with the transmission, as the transmission control information, into each of the blocks, that is, the coding unit 207, the modulation unit 208, and the transmission unit 209, and suitably inputs the physical layer control information associated with the reception, as the reception control information, into each of the blocks, that is, the reception unit 201, the demodulation unit 202, and the decoding unit 203.

The control information relating to the uplink, of the terminal device 1 for each of the MAC layer, the RLC layer, and the PDCP layer of the base station apparatus 2 is included in the reception data control information. Furthermore, the control information relating to the downlink, of the terminal device 1 for each of the MAC layer, the RLC layer, and the PDCP layer of the base station apparatus 2 is included in the transmission data control information. That is, the reception data control information and transmission data control information are configured for every terminal device 1.

The network signal transmission and reception unit 211 performs the transmission (transfer) or reception of a control message between the base station apparatuses 2 or between the higher-level network apparatus (the MME or the SGW) and the base station apparatus 2, or of the user data. Other constituent elements of the base station apparatus 2 and the transfer path for data (the control information) between the constituent elements are omitted in FIG. 2, but it is apparent that multiple blocks that have other functions indispensable for the base station apparatus 2 to operate are retained as constituent elements. For example, a Radio Resource Management unit or an application layer unit is present over the radio resource control unit 210.

Figure 3:
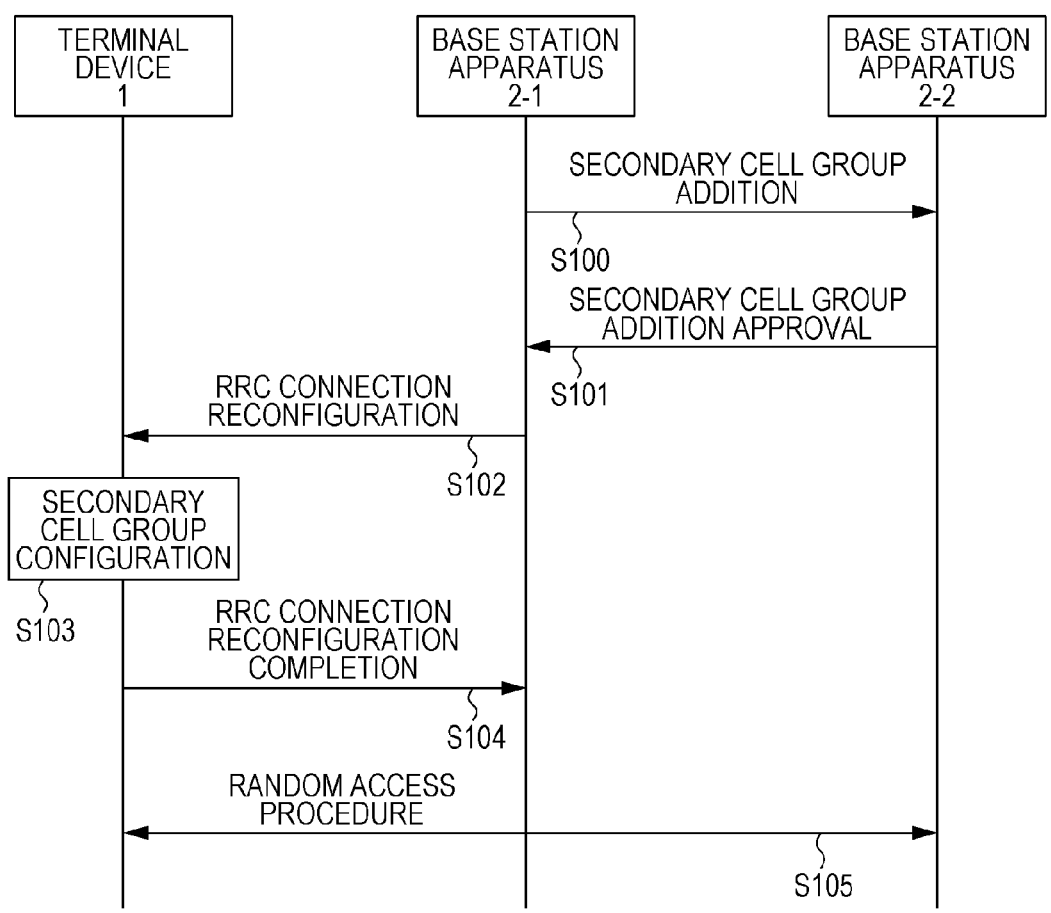
FIG. 3 is one example of a sequence chart diagram relating to a configuration procedure for a Secondary Cell Group according to the first embodiment of the present invention.

FIG. 3 is a sequence chart diagram illustrating one example of communication control of the terminal device 1 relating to a configuration procedure for the Secondary Cell Group according to the first embodiment of the present invention.

In FIG. 3, the terminal device 1 and the base station apparatus 2 are in a state of being connected to each other using multiple cells. Furthermore, the base station apparatus 2 includes the base station apparatus 2-1 and the base station apparatus 2-2. Typically, the base station apparatus 2-1 is the base station apparatus 2 that constitutes the macro cell, and the base station apparatus 2-2 is the base station apparatus 2 that constitutes the small cell, but this does not limit a constitution of the corresponding cell.

First, the base station apparatus 2-1 that is the master base station apparatus makes a decision to start communication using the dual connectivity. Then, a decision is made to add a cell (a secondary cell group cell) of the base station apparatus 2-2 that is the secondary base station apparatus to the terminal device 1, and a secondary cell group addition message is generated and is transmitted to the base station apparatus 2-2 (Step S100).

The base station apparatus 2-1 transmits pieces of indispensable configuration information, such as capability information (UE Capability) of the terminal device 1, information on a cell constitution that is currently configured for the terminal device 1, radio resource information, and information on a cell that is a candidate target for addition, in a state of being included in the secondary cell group addition message. The base station apparatus 2-1 can determine the cell that is the candidate target for addition, based on one or multiple combinations of a measurement event report or a CSI report, and information such as a cell load situation. Furthermore, the base station apparatus 2-1 can determine the cell that is the candidate target for addition, using pieces of information other than this.

The base station apparatus 2-2 receives the secondary cell group addition message, and if it is possible that any one of the candidate target cells is configured for (added to) the terminal device 1, generates a secondary cell group addition approval message for transmission to the base station apparatus 2-1 (Step S101). At this time, the base station apparatus 2-2 transmits at least a radio resource configuration (for example, broadcast information on the Secondary Cell Group, radio resource shared configuration information, random access configuration information, configuration information on the Physical Uplink Control Channel, and the like) relating to a cell in the Secondary Cell Group that is to be added, in a state of being included in the secondary cell group addition approval message.

Included in the random access configuration information are preamble information (Dedicated Preamble), radio resource information (power adjustment parameter, the maximum number of times that the preamble is retransmitted, or the like) for the transmission of the Physical Random Access Channel, timer information relating to the random access procedure, and the like.

The base station apparatus 2-1 transmits the radio resource configuration that is included in the secondary cell group addition approval message to the terminal device 1, in a state of being included in an RRC connection reconfiguration message (Step S102). Included in the RRC connection reconfiguration message is at least a configuration of the cell (the primary secondary cell) in the Secondary Cell Group that is to be added. The RRC connection reconfiguration message is a layer 3 massage, and is, for example, a RRCConnectionReconfiguration message.

In a case where the RRC connection reconfiguration message is received, the terminal device 1 starts a sequence of configuration procedures, and configures the cell (the Secondary Cell Group) of the base station apparatus 2-2 in accordance with configuration information on the Secondary Cell Group, which is included in the RRC connection reconfiguration message (Step S103).

If the control that is notified with the RRC connection reconfiguration message states tells the addition of the Secondary Cell Group, in addition to the MAC layer (a first MAC layer), the RLC layer (a first RLC layer), and the PDCP layer (a first PDCP layer), which correspond to the base station apparatus 2-1 (the Master Cell Group), the terminal device 1 may perform processing relating to configuration (establishment) of each of the MAC layer (a second MAC layer), the RLC layer (a second RLC layer), and the PDCP layer (a second PDCP layer), which correspond to the base station apparatus 2-2 (the Secondary Cell Group).

In a case where processing through the use of the RRC connection reconfiguration message is ended, the terminal device 1 transmits an RRC connection reconfiguration completion message to the base station apparatus 2-1 (Step S104). The RRC connection reconfiguration completion message is the layer 3 message, and is, for example, an RRCconnectionReconfigurationComplete message.

Furthermore, in a case where the uplink synchronization procedure is indispensable, the terminal device 1 that configures the primary secondary cell as the Secondary Cell Group executes the random access procedure on the base station apparatus 2-2 (Step S105). The case where the uplink synchronization procedure is indispensable a case where the primary secondary cell is newly added for the terminal device 1, a case where handover (change) from a current primary secondary cell to another primary secondary cell is performed, or a case where, for other reasons, the base station apparatus 2 needs the uplink synchronization procedure.

At this point, in a case where the base station apparatus 2 needs the uplink synchronization procedure, information for determining whether or not to need the uplink synchronization procedure for the base station apparatus 2-2 can be notified to the terminal device 1 explicitly or implicitly, using the RRC connection reconfiguration message that is transmitted from the base station apparatus 2-1.

For example, with the RRC connection reconfiguration message, information (for example, an information element indicating whether or not the synchronization procedure is needed) on whether or not to need the primary secondary cell and the uplink synchronization procedure is notified and thus, the base station apparatus 2 can notify the terminal device 1 whether or not the uplink synchronization procedure is needed.

Furthermore, with the RRC connection reconfiguration message, information (for example, an information element indicating whether the primary secondary cell is a cell that requests a synchronization procedure request cell or a cell that does not request the synchronization procedure) on whether or not the primary secondary cell to be configured is a cell that needs the uplink synchronization procedure or a cell that does not need the uplink synchronization procedure is notified and thus, the base station apparatus 2 can notify the terminal device 1 whether or not the uplink synchronization procedure is needed.

Moreover, even in a case where the uplink synchronization procedure is requested, in a case where a result of measurement of reception quality of the cell (the primary secondary cell) of the base station apparatus 2-2 falls below a certain threshold, the terminal device 1 may not start the random access procedure for the cell of the base station apparatus 2-2. The reception quality is a RSRP or RSRQ that is obtained from a downlink reference signal, an RSSI, or a bus loss. The terminal device 1 may notify the threshold using the dedicated RRC message or the broadcast information (the system information). Furthermore, the terminal device 1 may obtain the threshold by combining multiple parameters that are notified using the dedicated RRC message or the broadcast information (the system information).

As one procedure for the configuration of the Secondary Cell Group, the RRC layer instructs lower layers (the PDCP layer, the RLC layer, the MAC layer, and the like) to execute the random access procedure in Step S105 in FIG. 3. Furthermore, regardless of whether the random access procedure succeeds or fails, the terminal device 1 may transmit the RRC connection reconfiguration completion message to the base station apparatus 2-1.

Figure 4:
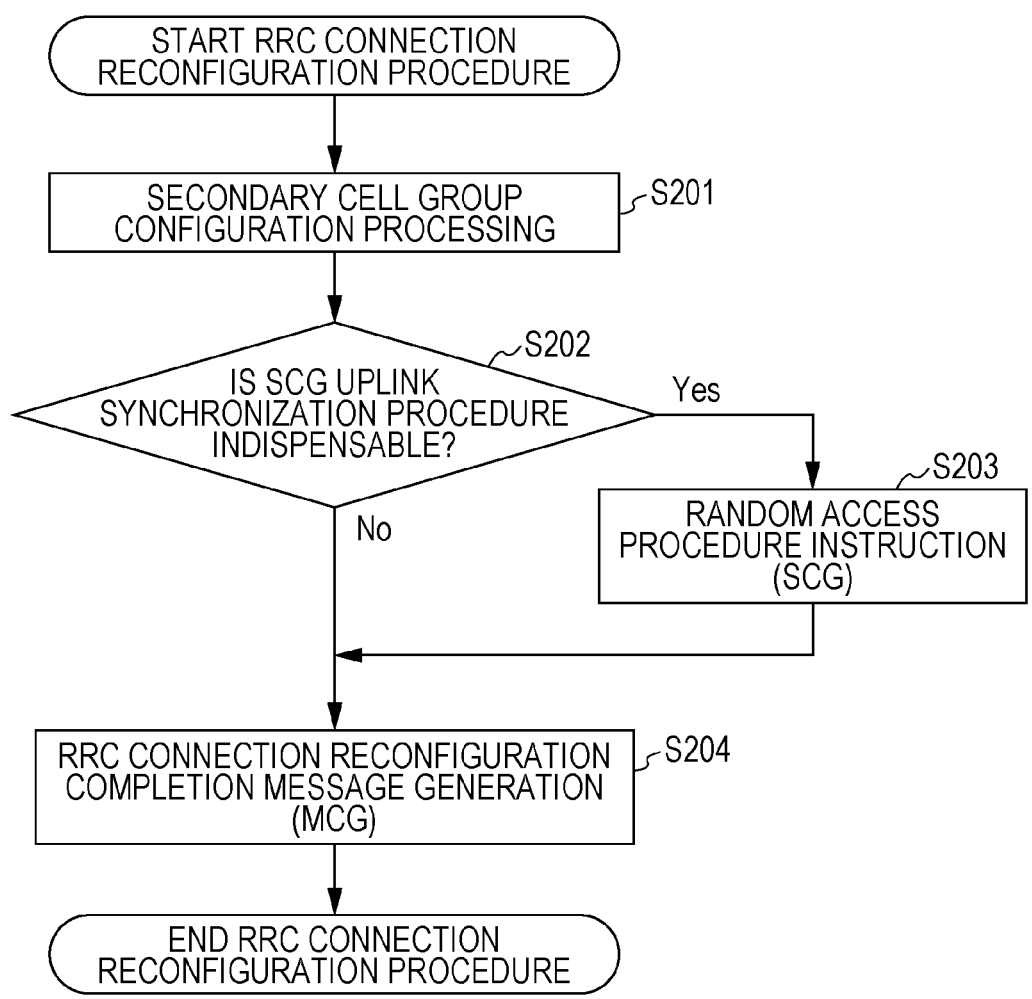
FIG. 4 is a flowchart diagram illustrating one example of an RRC connection reconfiguration procedure in an RRC layer of the terminal device according to the first embodiment of the present invention.

FIG. 4 is a flowchart diagram illustrating one example of the RRC connection reconfiguration procedure in the RRC layer of the terminal device 1 according to the first embodiment. The terminal device 1 receives the RRC connection reconfiguration message, and, in a case where the addition or the change of the cell in the Secondary Cell Group is needed, the procedure in the present chart is started.

The terminal device 1 performs configuration relating to the Secondary Cell Group in accordance with the radio resource configuration that is notified with the received RRC connection reconfiguration message (Step S201). At this point, in a case where the uplink synchronization procedure for the Secondary Cell Group (the primary secondary cell) is needed (YES in Step S202), the RRC layer of the terminal device 1 instructs the lower layer (the second MAC layer) corresponding to the Secondary Cell Group to start the random access procedure for the base station apparatus 2-2 (Step S203).

In order to indicate that the uplink synchronization procedure is needed for the terminal device 1, the base station apparatus 2 can notify information indicating that the uplink synchronization procedure is needed, in a state of being configured as an information element (an RRC parameter) for the RRC connection reconfiguration message. For example, (1) information on whether the primary secondary cell and the uplink synchronization procedure are needed, (2) information on whether or not the cell is a cell that needs the uplink synchronization procedure is needed, and the like can be used.

In the case of (1), the information element indicating that the synchronization procedure is requested or is not requested is included in the radio resource configuration (for example, the random access configuration information) of the primary secondary cell. In a case where the information indicating that the synchronization procedure is needed, the RRC layer of the terminal device 1 instructs the lower layer (the second MAC layer) corresponding to the Secondary Cell Group to start the random access procedure for the base station apparatus 2-2.

In the case of (2), the information element indicating whether the cell is the cell that requests the synchronization procedure or the cell that does not request the synchronization procedure is included in the radio resource configuration (for example, a cell access-related configuration) for every broadcast information or every cell. The information element may be list information including multiple pieces of cell information (a cell ID, a frequency, a CGI, and the like). In a case where the primary secondary cell is notified as the cell that requests the synchronization procedure, the RRC layer of the terminal device 1 instructs the lower layer (the second MAC layer) corresponding to the Secondary Cell Group to start the random access procedure for the base station apparatus 2-2.

Furthermore, in a case where an information element indicating that the uplink synchronization procedure for the Secondary Cell Group (the primary secondary cell) is needed is not configured, or in a case where an information element indicating that the uplink synchronization procedure for the Secondary Cell Group is not needed is configured (No in Step S202), the RRC layer of the terminal device 1 generates an RRC connection reconfiguration completion message that is a response to the received RRC connection configuration message, and transfers the RRC connection reconfiguration completion message to the lower layer (the first PDCP layer) corresponding to the Master Cell Group (Step S204).

Moreover, when a configuration of the primary secondary cell that is notified with the received RRC connection reconfiguration message is a configuration for a new primary secondary cell, or in a case where the primary secondary cell is newly added (configured), the RRC layer of the terminal device 1 may determine that the uplink synchronization procedure for the Secondary Cell Group (the primary secondary cell) is implicitly needed.

In this case, when the configuration of the primary secondary cell that is notified with the received RRC connection reconfiguration message is a configuration (update) for the same primary secondary cell that have already been configured, the RRC layer of the terminal device 1 may determine that the uplink synchronization procedure for the Secondary Cell Group (the primary secondary cell) is implicitly not needed.

Furthermore, in a case where a configuration (an addition or update) for the secondary cell in the Master Cell Group or the Secondary Cell Group is received with the RRC connection reconfiguration message, the RRC layer of the terminal device 1 may determine that the uplink synchronization procedure for the Secondary Cell Group (the primary secondary cell) is implicitly not needed.

In a case where the lower layer (the second MAC layer) corresponding to the Secondary Cell Group is instructed to start the random access procedure in Step S203, the RRC layer of the terminal device 1 may start processing in Step S204 without waiting for a report on whether the random access procedure for the base station apparatus 2-2 results in a succession or a failure, which is notified by the lower layer (the second MAC layer).

Moreover, instead of instructing the lower layer (the second MAC layer) corresponding to the Secondary Cell Group to start the random access procedure in Step S203, the RRC layer of the terminal device 1 may trigger the Scheduling Request (SR) in the lower layer (the second MAC layer) corresponding to the Secondary Cell Group. In a case where the Scheduling Request is triggered by the RRC layer of the terminal device 1, the second MAC layer determines that this is a state (which is also referred to as a SR Pending state) in which the Scheduling Request is triggered, and starts a scheduling request procedure.

Furthermore, the RRC layer of the terminal device 1 may trigger a power headroom for the lower layer (the second MAC layer) corresponding to the Secondary Cell Group in Step S203, and may further trigger the Scheduling Request (SR) in the lower layer (the second MAC layer) corresponding to the Secondary Cell Group.

Furthermore, with the RRC connection reconfiguration message, the base station apparatus 2 may notify RRC timer information that is applied to the uplink synchronization procedure (the random access procedure) for the primary secondary cell that is configured.

Figure 5:
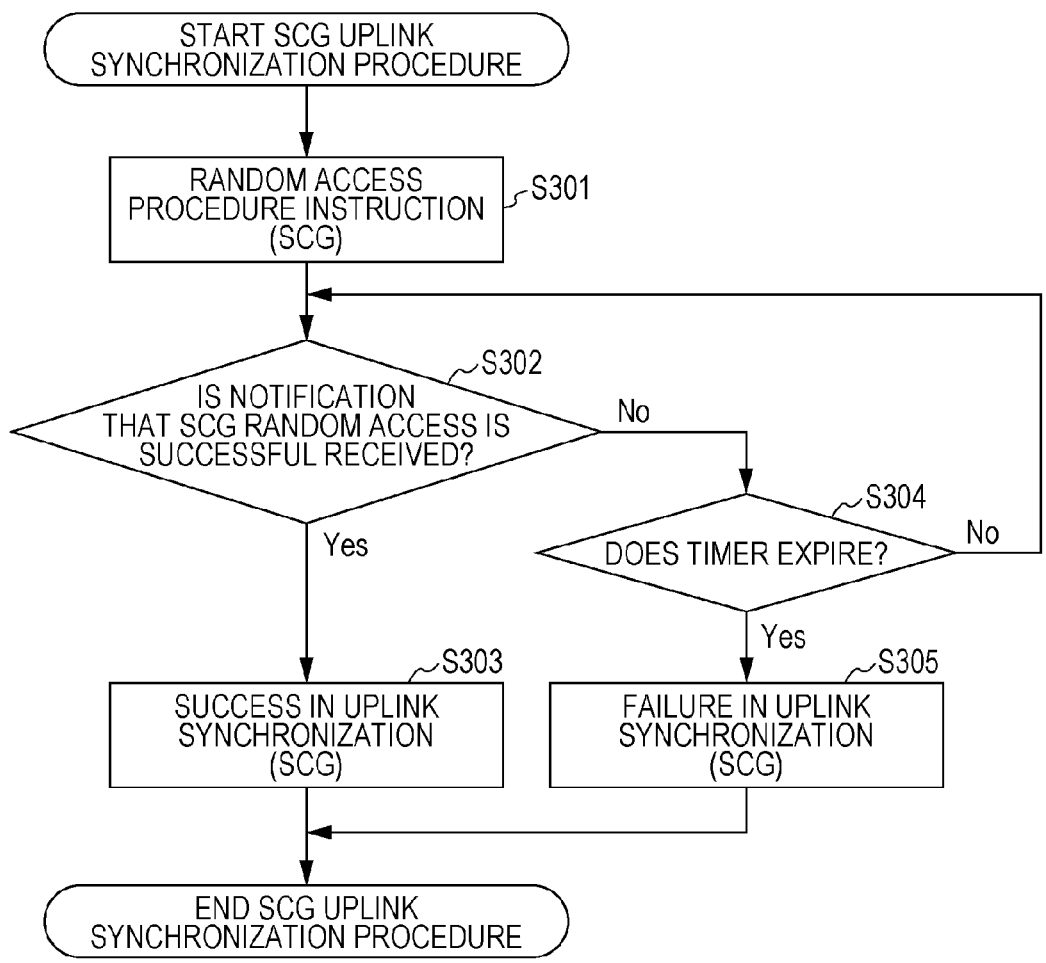
FIG. 5 is a flowchart diagram illustrating details of an uplink synchronization procedure for the RRC layer of the terminal device according to the first embodiment of the present invention.

FIG. 5 is a flow chart diagram illustrating details of the uplink synchronization procedure in the RRC layer of the terminal device 1 in a case where the random access procedure for the SCG (the primary secondary cell) is indicated.

Processing by the terminal device 1 in Step S301 in FIG. 5 may be the same as the processing in Step S203 in FIG. 4. That is, the RRC layer of the terminal device 1 determines that the uplink synchronization procedure for the SCG cell (the primary secondary cell) is needed, and instructs the lower layer (the second MAC layer) to start the random access procedure (or to trigger the SR) for the base station apparatus 2-2. Moreover, in a case where the notification is provided with the RRC connection reconfiguration message, the RRC layer of the terminal device 1 notifies the lower layer (the second MAC layer) of the random access configuration information such as the dedicated preamble.

At this point, the terminal device 1 activates (starts to count) an RRC timer that is notified with the RRC connection reconfiguration message. The RRC timer is also referred to as an SCG synchronization processing timer. The base station apparatus 2 can configure a dedicated timer value that differs from one terminal device 1 to another, for the RRC timer. The RRC layer of the terminal device 1 may activate the RRC timer after the lower layer is instructed to start the random access procedure (or to trigger the SR), and may activate the RRC timer when the RRC connection reconfiguration message is received.

In a case where the lower layer notifies that the random access procedure which the lower layer is instructed to start in Step S301 is successful (Yes in Step S302), the RRC layer of the terminal device 1 determines that the uplink synchronization procedure for the SCG results in a success (Step S303) and ends the processing.

In Step S303, the RRC layer of the terminal device 1 stops (or releases) the RRC timer. At this time, when the configuration has not been applied until the random access procedure is successful is present, the RRC layer of the terminal device 1 applies the configurations to the lower layers, respectively. For example, a configuration (a CQI report configuration, a scheduling request configuration, an SRS configuration, or the like) relating to an uplink physical channel or a physical signal on the uplink channel, which needs the uplink synchronization, may be applied.

On the other hand, if the lower layer (the second MAC layer) does not notify that the random access procedure which the lower layer is instructed to start in Step S301 is successful (No in Step S302), the RRC layer of the terminal device 1 determines whether or not the activated RRC timer expires (Step S304). If the timer does not expire, turning to Step S302 takes place, and it is determined whether or not the lower layer (the second MAC layer) notifies that the random access procedure for the SCG is successful.

In a case where the RRC timer expires in Step S304, the RRC layer of the terminal device 1 determines that the uplink synchronization procedure for the SCG fails (Step S305). In Step S305, the terminal device 1 may end the random access procedure for the primary secondary cell, and may further release a configuration (a random access configuration, a physical uplink control channel configuration, a CQI report configuration, a scheduling request configuration, an SRS configuration, or the like) relating to the uplink physical channel or the physical signal on the uplink channel.

Furthermore, in a case where the RRC timer is counted (is operating or running), although the lower layer (the second MAC layer) notifies information indicating that a problem relating to the random access occurs, that is, information (random access problem indication) indicating that a counter counting the number of times that the preamble for the random is transmitted reaches the maximum number of times of transmission which is notified by the base station apparatus 2, the RRC layer of the terminal device 1 may disregard this.

That is, the RRC timer indicates until what time (subframe) a notification indicating that the random access procedure for the primary secondary cell in the lower layer (the second MAC layer) is successful is retained in the RRC layer of the terminal device 1.

However, in a case where the RRC timer is not counted, when the lower layer (the second MAC layer) notifies the information indicating that the problem relating to the random access, the RRC layer of the terminal device 1 needs to perform processing, such as one that stops the uplink transmission in the primary secondary cell.

With this constitution, the terminal device 1 and the base station apparatus 2 can provide an instruction to start the uplink synchronization procedure for the base station apparatus 2-2, as the configuration procedure relating to the Secondary Cell Group. Because of this, the terminal device 1 and the base station apparatus 2-2 can be quickly set to be in a state where communication is possible.

With regard to the communication with the base station apparatus 2 (the base station apparatus 2-2) through the SCG cell during the dual connectivity, the terminal device 1 according to the present embodiment can realize a communication method of rapidly performing the uplink synchronization procedure if need arises. Furthermore, with regard to the communication with the terminal device 1 through the SCG cell dual connectivity, the base station apparatus 2 according to the present embodiment can realize a communication method of causing the terminal device 1 to rapidly start the random access procedure.

According to the first embodiment, the terminal device 1 includes means that determines whether or not the uplink synchronization procedure is needed for the cell (the primary secondary cell) in the Secondary Cell Group, based on the information element that is notified by the base station apparatus 2, and starts the random access procedure for the primary secondary cell if need arises, in a case where a configuration (an addition or change) for the cell in the Secondary Cell Group is performed. Because of this, the radio resource can be efficiently used and communication control relating to the configuration procedure can be streamlined.

Furthermore, because the terminal device 1 includes means that determines whether the random access procedure succeeds or fails, based on the timer relating to the random access procedure for the primary secondary cell, the communication control relating to the configuration procedure can be streamlined.

Furthermore, the base station apparatus 2 includes means that causes the terminal device 1 to determine whether or not the uplink synchronization procedure is needed for the cell (the primary secondary cell) in the Secondary Cell Group in a case where the random access procedure for the primary secondary cell is needed. Because of this, the communication control relating to the configuration procedure can be streamlined.

Furthermore, because the base station apparatus 2 includes means that causes the terminal device 1 to transmit the timer relating to the random access procedure for the primary secondary cell and determine whether the random access procedure succeeds or fails in the terminal device 1, based on the timer. Because of this, the communication control relating to the configuration procedure can be streamlined.

Second Embodiment

A second embodiment of the present invention will be described below.

The reason why the RRC layer instructs the MAC layer to start the random access procedure according to the first embodiment is that while satisfaction of the triggering condition for the Buffer Status Report with the MAC layer guarantees in the RRC connection reconfiguration procedure in the related art that the random access procedure is started, it is not guaranteed in the RRC connection reconfiguration procedure using the dual connectivity that the triggering condition for the Buffer Status Report is satisfied with the MAC layer corresponding to the Secondary Cell Group.

Accordingly, according to the second embodiment, in the RRC connection reconfiguration procedure using the dual connectivity, it is guaranteed that the triggering condition for the Buffer Status Report is satisfied, and the communication control that minimizes the change of the configuration procedure for the terminal device 1 in the related art is realized.

Because constitutions of the terminal device 1 and the base station apparatus 2 according to the second embodiment are the same as those in the first embodiment, descriptions thereof are omitted. However, the radio resource control unit 110 of the terminal device 1 is equipped with a function of configuring the triggering of the Buffer Status Report or a function of configuring a timer relating to the triggering of the Buffer Status Report for the transmission data control unit 106. The transmission data control unit 106 is equipped with a function of executing a sequence of procedures relating to the Buffer Status Report based on the triggering of the Buffer Status Report that is configured by the radio resource control unit 110, or on the timer relating to the triggering of the configured Buffer Status Report.

Figure 6:
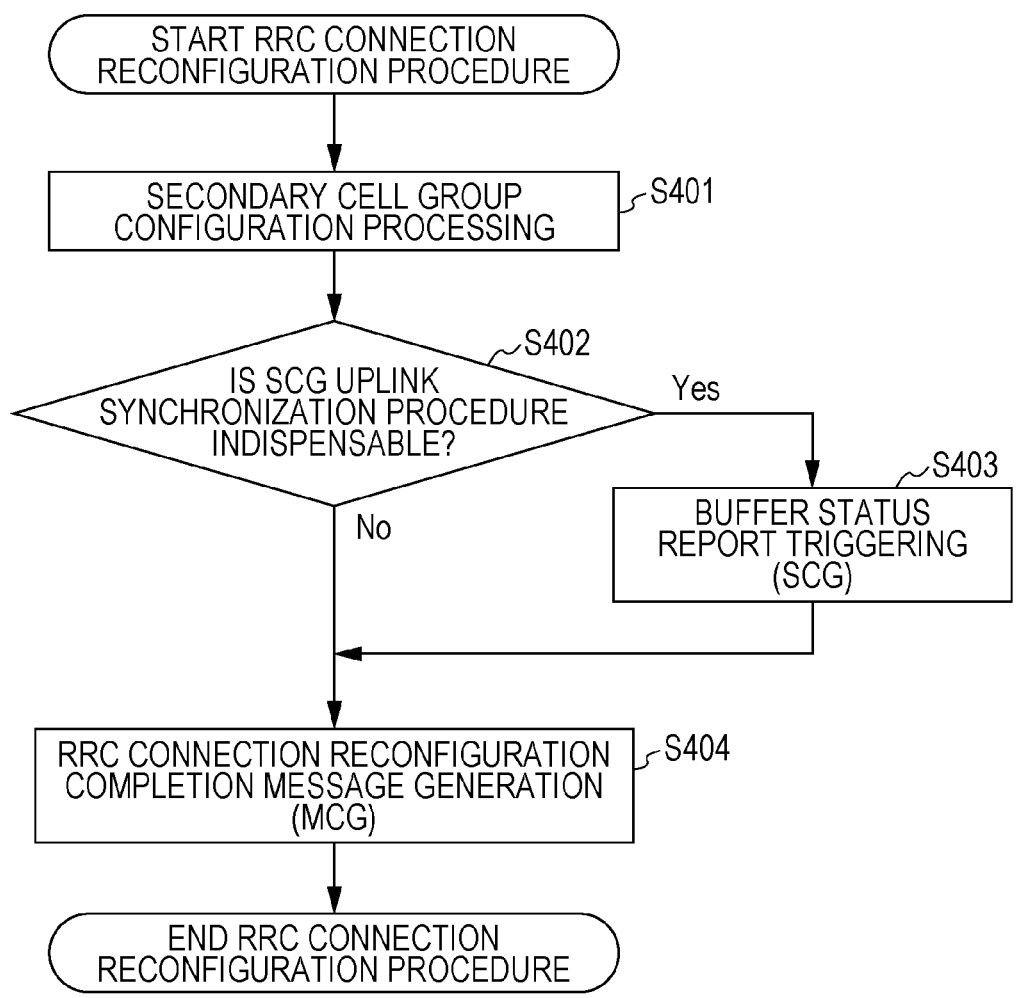
FIG. 6 is a flowchart diagram illustrating one example of an RRC connection reconfiguration procedure in an RRC layer of a terminal device according to the first embodiment of the present invention.

FIG. 6 is a flowchart diagram illustrating one example of an RRC connection reconfiguration procedure in an RRC layer of a terminal device 1 according to the second embodiment. The terminal device 1 receives the RRC connection reconfiguration message, and, in the case where the addition or the change of the cell in the Secondary Cell Group is needed, the procedure in the present chart is started.

The terminal device 1 performs the configuration relating to the Secondary Cell Group in accordance with the radio resource configuration that is notified with the received RRC connection reconfiguration message (Step S401). At this point, in the case where the uplink synchronization procedure for the Secondary Cell Group (the primary secondary cell) is needed (YES in Step S402), the RRC layer of the terminal device 1 instructs the lower layer (the second MAC layer) corresponding to the Secondary Cell Group to trigger the Buffer Status Report (Step S403). For example, the RRC layer of the terminal device 1 may instruct the lower layer (the second MAC layer) corresponding to the Secondary Cell Group to trigger the Regular BSR in the related art.

At this point, in order to indicate that the uplink synchronization procedure is needed for the terminal device 1, the base station apparatus 2 can notify the information (the information element) indicating that the uplink synchronization procedure is needed, in a state of being explicitly configured for the RRC connection reconfiguration message. For example, the base station apparatus 2 may indicate that the uplink synchronization procedure is needed, by using the information element that is described according to the first embodiment. Furthermore, for example, the base station apparatus 2 may indicate that the uplink synchronization procedure is needed, by using the information element indicating whether or not to trigger the Buffer Status Report.

Furthermore, in the case where the information element indicating that the uplink synchronization procedure for the Secondary Cell Group (the primary secondary cell) is needed is not configured, or in the case where the information element indicating that the uplink synchronization procedure for the Secondary Cell Group is not needed is configured (No in Step S402), the RRC layer of the terminal device 1 generates the RRC connection reconfiguration completion message that is the response to the received RRC connection configuration message, and transfers the RRC connection reconfiguration completion message to the lower layer (the first PDCP layer) corresponding to the Master Cell Group (Step S404).

Moreover, when a configuration of the primary secondary cell that is notified with the received RRC connection reconfiguration message is a configuration for a new primary secondary cell, or in a case where the primary secondary cell is newly added (configured), the RRC layer of the terminal device 1 may determine that the uplink synchronization procedure for the Secondary Cell Group (the primary secondary cell) is implicitly needed.

In this case, when the configuration of the primary secondary cell that is notified with the received RRC connection reconfiguration message is a configuration (update) for the same primary secondary cell that have already been configured, the RRC layer of the terminal device 1 may determine that the uplink synchronization procedure for the Secondary Cell Group (the primary secondary cell) is implicitly not needed.

Furthermore, in the case where the configuration (the addition or update) for the secondary cell in the Master Cell Group or the Secondary Cell Group is received with the RRC connection reconfiguration message, the RRC layer of the terminal device 1 may determine that the uplink synchronization procedure for the Secondary Cell Group (the primary secondary cell) is implicitly not needed.

Furthermore, the base station apparatus 2 may notify the terminal device 1 of information indicating that the uplink synchronization procedure is needed, using the MAC control element, not with the RRC connection reconfiguration message.

In a case where the lower layer (the second MAC layer) corresponding to the Secondary Cell Group is instructed to trigger the Buffer Status Report in Step S403, the RRC layer of the terminal device 1 may start processing in Step S404 without waiting for the report on whether the random access procedure for the base station apparatus 2-2 results in a success or a failure, which is notified by the lower layer (the second MAC layer).

Moreover, instead of instructing the lower layer (the second MAC layer) corresponding to the Secondary Cell Group to trigger the Buffer Status Report in Step S203, the RRC layer of the terminal device 1 may trigger the Scheduling Request (SR) in the lower layer (the second MAC layer) corresponding to the Secondary Cell Group. In the case where the Scheduling Request is triggered by the RRC layer of the terminal device 1, the second MAC layer determines that this is the state (which is also referred to as a SR Pending state) in which the Scheduling Request is triggered, and starts the scheduling request procedure.

Furthermore, instead of instructing the lower layer (the second MAC layer) corresponding to the Secondary Cell Group to trigger the Buffer Status Report in Step S203, the RRC layer of the terminal device 1 may instruct the lower layer (the second MAC layer) corresponding to the Secondary Cell Group to activate an MAC timer. In a case where the MAC timer expires, the second MAC layer may trigger the Regular BSR in the related art, may trigger the Scheduling Request (SR) and may start the random access procedure.

Furthermore, in a case where the Regular BSR in the related art is triggered before the MAC timer expires, the lower layer (the second MAC layer) corresponding to the Secondary Cell Group may stop the MAC timer and may start a report procedure for the Buffer Status Report for the Secondary Cell Group.

Furthermore, in a case where the starting of the random access procedure for the Secondary Cell Group is requested using the Physical Downlink Control Channel (PDCCH) before the MAC timer expires, the lower layer (the second MAC layer) corresponding to the Secondary Cell Group may stop the MAC timer, and may start the random access procedure for the Secondary Cell Group.

With this constitution, the terminal device 1 and the base station apparatus 2 can provide an instruction to start the uplink synchronization procedure for the base station apparatus 2-2, as the configuration procedure relating to the Secondary Cell Group, by using a procedure for a Buffer Status Report in the related art. Because of this, the terminal device 1 and the base station apparatus 2-2 can be quickly set to be in the state where the communication is possible.

With regard to the communication with the base station apparatus 2 (the base station apparatus 2-2) through the SCG cell during the dual connectivity, the terminal device 1 according to the present embodiment can realize the communication method of rapidly performing the uplink synchronization procedure if need arises. Furthermore, with regard to the communication with the terminal device 1 through the SCG cell dual connectivity, the base station apparatus 2 according to the present embodiment can realize the communication method of causing the terminal device 1 to rapidly start the random access procedure.

According to the second embodiment, the terminal device 1 includes means that determines whether or not the uplink synchronization procedure is needed for the cell (the primary secondary cell) in the Secondary Cell Group, based on the information element that is notified by the base station apparatus 2, and triggers the Buffer Status Report in the MAC layer corresponding to the Secondary Cell Group if need arises, in the case where the configuration (the addition or change) of the cell in the Secondary Cell Group is performed. Because of this, the radio resource can be efficiently used and the communication control relating to the configuration procedure can be streamlined.

Furthermore, the base station apparatus 2 includes means that causes the terminal device 1 to determine whether or not the uplink synchronization procedure is needed for the cell (the primary secondary cell) in the Secondary Cell Group in a case where the random access procedure for the primary secondary cell is needed. Because of this, the communication control relating to the configuration procedure can be streamlined.

Moreover, the embodiments described above are only simple examples, and can be realized using various modification examples and substitution examples. For example, it is possible that an uplink transmission scheme is also applied to a communication system in compliance with either a frequency division duplex (FDD) scheme or a time division duplex (TDD) scheme. Furthermore, because the name of each parameter that is described according to the embodiments is given for convenience of description, even if the name of the parameter that is applied in practice and the name of the parameter according to the embodiments of the present invention are different from each other, this does not exert any influence on the gist of the invention claimed, in the embodiments of the present invention.

Furthermore, for example, in a case where, for the purpose of further standardization of the communication control, simplification of mounting and testing, and the like, the primary secondary cell is configured, the terminal device 1 may be constituted in such a manner as to start the random access procedure for the base station apparatus 2-2 at all times. In this case, the terminal device 1 may not perform the determination of the uplink synchronization procedure.

Furthermore, the terminal devices 1 include not only a portable or moving mobile station apparatus, but also an stationary-type electronic apparatus that is installed indoors or outdoors, or a non-moving-type electronic apparatus, for example, a cellular phone, a personal computer, a tablet type terminal, an AV apparatus, a kitchen apparatus, a cleaning and washing machine, an air conditioner, office equipment, a vending machine, other household apparatuses or measuring apparatuses, a vehicle-mounted apparatus, and all devices that result from building a communication function into a wearable device or a health care device that is capable of be worn on a human body. Furthermore, the terminal device 1 is used not only for human-to-human or human-to-machine communication, but also for machine-to-machine communication (Machine Type Communication) or Device-to-Device Communication (D2D).

The terminal device 1 is also referred to as a user terminal, a mobile station apparatus, a communication terminal, a mobile machine, a terminal, a User Equipment (UE), or a Mobile Station (MS). The base station apparatus 2 is also referred to as a wireless base station apparatus, a base station, a wireless base station, a fixed station, a NodeB (NB), an evolved Node B (eNB), a Base Transceiver Station (BTS), or a Base Station (BS).

Moreover, the base station apparatus 2 is referred to as the NB in UMTS that is stipulated by 3GFP, and as the eNB in EUTRA or Advanced EUTRA. Moreover, the terminal device 1 in UMTS that is stipulated by 3GPP, and in EUTRA and Advanced EUTRA is also referred to as the UE.

Furthermore, for convenience of description, the method, the means, and the algorithm step of realizing the functions of, some of the functions, of the units of each of the terminal device 1 and the base station apparatus 2 are described referring to the functional block diagrams of the terminal device 1 and the base station apparatus 2 according to the embodiments, but these can be realized directly by software, a software module that is implemented by a processor, or combinations of these two.

If the method, the means, and the algorithm step are implemented in hardware, in addition to being constituted as described referring to the block diagrams, the terminal device 1 and the base station apparatus 2 each may be constituted from a power supply device or battery that supplies power to the terminal device 1 and the base station apparatus 2, a display device such as a liquid crystal display, a display drive device, a memory, an input and output interface, input and output terminals, a speaker, and other peripheral devices.

If the method, the means, and the algorithm step are implemented in software, the function can be retained as one or more commands or codes on a computer-readable medium, and can be transmitted. The computer-readable media include both of a communication media or a computer recording media that helps to carry a computer program from one place to another place.

Then, one or more commands or codes may be recorded on the computer-readable recording medium, and a computer system may be caused to read and execute the one or more command or codes that are recorded on the recording medium to perform control of the terminal device 1 or the base station apparatus 2. Moreover, the "computer system" here is defined as including an OS and hardware components such as a peripheral device.

The operations that are described according to each embodiment of the present invention may be realized with a program. A program running on the terminal device 1 and the base station apparatus 2 according to each embodiment of the present invention is a program (a program for causing a computer to operate) that controls a CPU and the like in such a manner as to realize the above-described functions of each embodiment according to each embodiment of the present invention. Then, pieces of information that are handled in the apparatus and the device are temporarily stored in a RAM while being processed. Thereafter, the pieces of information are stored in various ROMs or HDDs, and if need arises, is read by the CPU to be modified or written.

Furthermore, in some cases, the functions of the embodiments described above are realized by executing the program, and in addition, the functions of each embodiment of the present invention are realized by performing processing in conjunction with an operating system or other application programs, based on an instruction from the program.

Furthermore, the "computer-readable recording medium" refers to a portable medium, such as a semiconductor medium (for example, a RAM, a nonvolatile memory card, or the like), an optical recording medium (for example, a DVD, an MO, an MD, a CD, a BD, or the like), and a magnetic recording medium (for example, a magnetic tape, a flexible disk, or the like), and a recording device, such as a disk unit that is built into the computer system. Moreover, the "computer-readable recording media" is defined as including a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time.

Furthermore, the program described above may be one for realizing some of the functions described above and additionally may be one that can realize the functions described above in combination with a program that is already recorded in the computer system.

Furthermore, functional blocks or all features of each of the terminal device 1 and the base station apparatus 2 according to each embodiment described above can be built into or implemented by a general-purpose processor, a digital signal processor (DSP), an application-specific or general-purpose integrated circuit (ASIC), a field programmable gate-array signal (FPGA) or other programmable logic devices, a discrete gate or a transistor logic, a discrete hardware component, or a combination of these.

The general-purpose processor may be a microprocessor, and instead, the processor may be a conventional processor, a controller, a microcontroller, or a state machine. The general-purpose processor or each circuit described above may be constituted as a digital circuit, be constituted as an analog circuit, and be constituted as a combination of the digital circuit and the analog circuit.

Furthermore, the processor may be built as a combination of computing devices. For example, the processor may be a DSP and a microprocessor, multiple microprocessors, one or more microprocessors that are connected to a DSP core, or a combination of other such constitutions.

The embodiments of the present invention are described in detail above based on the specific examples, but it is apparent that the nature of each of the embodiments of the present invention and a scope of claims are not limited to the specific examples. A change in design and the like that fall within the scope that does not depart from the gist of the present invention are also included. Furthermore, the description in the present specification serves the purpose of providing an exemplary description, and does not impose any limitation to each embodiment of the present invention.

Furthermore, various modifications are possible within the scope of the present invention that is defined by claims and that is described according to the embodiments, and embodiments that are implemented by suitably combining technical means that are disclosed according to different embodiments are also included in the technical scope of the present invention. Furthermore, a configuration in which a constituent element that achieves the same effect is substituted for the one that is described according to each embodiment described above is also included in the technical scope of the present invention.

According to one aspect of the invention, there is provided a terminal device that at least uses a cell that belongs to a first base station apparatus and a cell that belongs to the second base station apparatus, which, in a cell configuration procedure for a second base station apparatus, determines whether or not an uplink synchronization procedure is needed for the second base station apparatus, based on an information element that is notified with a radio resource control message, which includes a cell configuration for the second base station apparatus, and which, in a case where the uplink synchronization procedure is needed, starts a random access procedure for the second base station apparatus.

Furthermore, in the terminal device according to embodiment of the present invention, the information element that is notified with the radio resource control message indicates whether or not the uplink synchronization procedure for the second base station apparatus is needed, in the cell configuration procedure.

Furthermore, in the terminal device according to the embodiment of the present invention, the information element that is notified with the radio resource control message indicates whether or not the cell that belongs to the second base station apparatus needs the uplink synchronization procedure.

Furthermore, according to another embodiment of the present invention, there is provided a terminal device that at least uses a cell that belongs to a first base station apparatus and a cell that belongs to the second base station apparatus, which, in a cell configuration procedure for a second base station apparatus, determines whether or not an uplink synchronization procedure is needed for the second base station apparatus, based on an information element that is notified with a radio resource control message, which includes a cell configuration for the second base station apparatus, and which, in a case where the uplink synchronization procedure is needed, triggers a Buffer Status Report for the second base station apparatus.

With this constitution, the terminal device can perform the efficient communication control in the cell configuration procedure.

Furthermore, according to still another embodiment of the present invention, there is provided a base station apparatus, which makes a connection to a terminal device that uses a cell in a cell group that belongs to a first base station apparatus and a cell in a cell group which belongs to a second base station apparatus that is different from the first base station apparatus, and which, in a cell configuration procedure for the terminal device, in a case where an uplink synchronization procedure is needed for the cell in the cell group that belongs to the second base station apparatus, configures an information element indicating that the uplink synchronization procedure is needed for the cell in the cell group that belongs to the second base station apparatus, for a radio resource control message, and transmits the radio resource control message to the terminal device.

Furthermore, the base station apparatus according to the embodiment of the present invention configures a timer for radio resource control message, and waits for a notification that the uplink synchronization procedure which is executed for the cell in the cell group that belongs to the second base station apparatus is successful, until the timer expires.

Furthermore, according to still another embodiment of the present invention, there is provided a base station apparatus, which makes a connection to a terminal device that uses a cell in a cell group that belongs to a first base station apparatus and a cell in a cell group which belongs to a second base station apparatus that is different from the first base station apparatus, and which, in a cell configuration procedure for the terminal device, in a case where an uplink synchronization procedure is needed for the cell in the cell group that belongs to the second base station apparatus, configures an information element indicating that a Buffer Status Report needs to be triggered, for a radio resource control message, and transmits the radio resource control message to the terminal device.

With this constitution, the base station apparatus can perform the efficient communication control in the cell configuration procedure for the terminal device.

Furthermore, according to still another embodiment of the present invention, there is provided a communication system including a terminal device and a base station apparatus that makes a connection to the terminal device, in which, in the terminal device, a cell that belongs to a first base station apparatus and a cell that belongs to a second base station apparatus are at least used, in which, in the base station apparatus, in a case where an uplink synchronization procedure is needed for a cell in a cell group that belongs to the second base station apparatus, an information element indicating that the uplink synchronization procedure is needed for a cell configuration for the second base station apparatus is configured for a radio resource control message, and the radio resource control message is transmitted to the terminal device, and in which, in the terminal device, the radio resource control message is received, whether or not the uplink synchronization procedure is needed for the second base station apparatus is determined based on the information element, in a configuration procedure for the cell that belongs to the second base station apparatus, and in a case where the uplink synchronization procedure is needed, a random access procedure for the second base station apparatus is started.

Furthermore, according to still another embodiment of the present invention, there is provided a communication system including a terminal device and a base station apparatus that makes a connection to the terminal device, in which, in the terminal device, a cell that belongs to a first base station apparatus and a cell that belongs to a second base station apparatus are at least used, in which, in the base station apparatus, in a case where an uplink synchronization procedure is needed for a cell in a cell group that belongs to the second base station apparatus, an information element indicating that the uplink synchronization procedure is needed for a cell configuration for the second base station apparatus is configured for a radio resource control message, and the radio resource control message is transmitted to the terminal device, and in which, in the terminal device, the radio resource control message is received, whether or not the uplink synchronization procedure is needed for the second base station apparatus is determined based on the information element, in a configuration procedure for the cell that belongs to the second base station apparatus, and in a case where the uplink synchronization procedure is needed, a Buffer Status Report is triggered for the second base station apparatus is started.

With this constitution, in the communication system that includes the terminal device and the base station apparatus, the efficient communication control can be performed in the configuration procedure for the cell.

Furthermore, according to still another embodiment of the present invention, there is provided a communication method for use in a terminal device that at least uses a cell that belongs to a first base station apparatus and a cell that belongs to the second base station apparatus, the communication method at least including a step of determining whether or not an uplink synchronization procedure is needed for the second base station apparatus, based on an information element that is notified with a radio resource control message, which includes a cell configuration for the second base station apparatus, in a cell configuration procedure for a second base station apparatus, and a step of starting a random access procedure for the second base station apparatus, in a case where the uplink synchronization procedure is needed.

Furthermore, according to still another embodiment of the present invention, there is provided a communication method for use in a terminal device that at least uses a cell that belongs to a first base station apparatus and a cell that belongs to the second base station apparatus, the communication method at least including a step of determining whether or not an uplink synchronization procedure is needed for the second base station apparatus, based on an information element that is notified with a radio resource control message, which includes a cell configuration for the second base station apparatus, in a cell configuration procedure for a second base station apparatus, and a step of triggering a Buffer Status Report for the second base station apparatus, in a case where the uplink synchronization procedure is needed.

With this constitution, in the communication scheme for use in the terminal device, the efficient communication control can be performed in the cell configuration procedure.

Furthermore, according to still another embodiment of the present invention, there is provided a communication method for used in a base station apparatus that at least uses a cell that belongs to the first base station apparatus and a cell that belongs to a second base station apparatus, the communication method at least including a step of making a connection to a terminal device that uses a cell in a cell group that belongs to a first base station apparatus and a cell in a cell group which belongs to a second base station apparatus that is different from the first base station apparatus, a step of configuring an information element indicating that the uplink synchronization procedure is needed for the cell in the cell group that belongs to the second base station apparatus, for a radio resource control message, in a case where an uplink synchronization procedure is needed for the cell in the cell group that belongs to the second base station apparatus, in a cell configuration procedure for the terminal device, and a step of transmitting the radio resource control message to the terminal device.

Furthermore, according to still another embodiment of the present invention, there is provided a communication method for use in a base station apparatus that at least uses a cell that belongs to the first base station apparatus and a cell that belongs to a second base station apparatus, the communication method at least including a step of making a connection to a terminal device that uses a cell in a cell group that belongs to a first base station apparatus and a cell in a cell group which belongs to a second base station apparatus that is different from the first base station apparatus, a step of configuring an information element indicating that a Buffer Status Report needs to be triggered for a radio resource control message, in a case where an uplink synchronization procedure is needed for the cell in the cell group that belongs to the second base station apparatus, in a cell configuration procedure for the terminal device, and a step of transmitting the radio resource control message to the terminal device.

With this constitution, in the communication method for use in the base station apparatus, the efficient communication control can be performed in the cell configuration procedure.

According to another still embodiment of the present invention, there is provided an integrated circuit that is built into a terminal device that at least uses a cell that belongs to a first base station apparatus and a cell that belongs to the second base station apparatus, the integrated circuit at least causing a terminal device to perform a function of determining whether or not an uplink synchronization procedure is needed for the second base station apparatus, based on an information element that is notified with a radio resource control message, which includes a cell configuration for the second base station apparatus, in a cell configuration procedure for a second base station apparatus, and a function of starting a random access procedure for the second base station apparatus, in a case where the uplink synchronization procedure is needed.

According to another still embodiment of the present invention, there is provided an integrated circuit that is built into a terminal device that at least uses a cell that belongs to a first base station apparatus and a cell that belongs to the second base station apparatus, the integrated circuit at least causing a terminal device to perform a function of determining whether or not an uplink synchronization procedure is needed for the second base station apparatus, based on an information element that is notified with a radio resource control message, which includes a cell configuration for the second base station apparatus, in a cell configuration procedure for a second base station apparatus, and a function of triggering a Buffer Status Report for the second base station apparatus, in a case where the uplink synchronization procedure is needed.

With this constitution, in the integrated circuit built into the terminal device, the efficient communication control can be performed in the cell configuration procedure.

Furthermore, according to still another embodiment of the present invention, there is provided an integrated circuit that is built into a base station apparatus, the integrated circuit at least causing the base station apparatus to perform a function of making a connection to a terminal device that uses a cell in a cell group that belongs to a first base station apparatus and a cell in a cell group which belongs to a second base station apparatus that is different from the first base station apparatus, a function of configuring an information element indicating that the uplink synchronization procedure is needed for the cell in the cell group that belongs to the second base station apparatus, for a radio resource control message, in a case where an uplink synchronization procedure is needed for the cell in the cell group that belongs to the second base station apparatus, in a cell configuration procedure for the terminal device, and a function of transmitting the radio resource control message to the terminal device.

Furthermore, according to still another embodiment of the present invention, there is provided an integrated circuit that is built into a base station apparatus, the integrated circuit at least causing the base station apparatus to perform a function of making a connection to a terminal device that uses a cell in a cell group that belongs to a first base station apparatus and a cell in a cell group which belongs to a second base station apparatus that is different from the first base station apparatus, a function of configuring an information element indicating that a Buffer Status Report needs to be triggered for a radio resource control message, in a case where an uplink synchronization procedure is needed for the cell in the cell group that belongs to the second base station apparatus, in a cell configuration procedure for the terminal device, and a function of transmitting the radio resource control message to the terminal device.

With this constitution, in the integrated circuit built into the base station apparatus, the efficient communication control can be performed in the cell configuration procedure.

In the present specification, each embodiment is disclosed in terms of the technology associated with the terminal device, the base station apparatus, the communication system, the control method, and the integrated circuit, in all of which the efficient communication control is performed, but a communication scheme that is applicable to each embodiment is not limited to a communication scheme that is compatible with EUTRA or EUTRA like Advanced EUTRA.

For example, the technology that is described in the present specification can be used in various wireless communication systems, such as Code Division Multiple Access (CDMA), Time Division Multiple Access (TDMA), Frequency Division Multiplexing Access (FDMA), orthogonal FDMA (OFDMA) system, single career FDMA (SC-FDMA), and other access schemes. Furthermore, in the present specification, the system and the network can be used synonymously.

INDUSTRIAL APPLICABILITY

The present invention can be applied to a mobile phone, a personal computer, a tablet-type computer, and the like.

DESCRIPTION OF REFERENCE NUMERALS

1 TERMINAL DEVICE
2, 2-1, 2-2 BASE STATION APPARATUS 101, 201 RECEPTION UNIT
102, 202 DEMODULATION UNIT
103, 203 DECODING UNIT
104, 204 RECEPTION DATA CONTROL UNIT
105, 205 PHYSICAL LAYER CONTROL UNIT
106, 206 TRANSMISSION DATA CONTROL UNIT
107, 207 CODING UNIT
108, 208 MODULATION UNIT
109, 209 TRANSMISSION UNIT
110, 210 RADIO RESOURCE CONTROL UNIT
211 NETWORK SIGNAL TRANSMISSION AND RECEPTION UNIT

The invention claimed is:

1. A terminal device configured and/or programmed to communicate with a base station apparatus using a first cell group and a second cell group, the terminal device comprising:

reception circuitry configured and/or programmed to receive, in a radio resource control (RRC) message, an information element indicating performing a random access for the second cell group as a configuration of the second cell group, the information element including a RRC timer corresponding to the random access for the second cell group and a preamble used for the random access; and transmission circuitry configured and/or programmed to
perform the random access using the preamble for the second cell group,
start counting the RRC timer,
generate a response message for the RRC message without waiting to receive result notification of the random access, and
transmit the response message using a cell of the first cell group, wherein in a case that the information element included in the RRC message is not received, the transmission circuitry is configured and/or programmed to
generate the response message without performing the random access for the second cell group, and
transmit the response message using the cell of the first cell group.

2. A communication method for a terminal device configured and/or programmed to communicate with a base station apparatus using a first cell group and a second cell group, the communication method comprising:

receiving, in a radio resource control (RRC) message, an information element indicating performing a random access for the second cell group as a configuration of the second cell group, the information element including a RRC timer corresponding to the random access for the second cell group and a preamble used for the random access;

performing the random access using the preamble for the second cell group;

starting counting the RRC timer;

generating a response message for the RRC message without waiting to receive result notification of the random access; and transmitting the response message using a cell of the first cell group, wherein in a case that the information element included in the RRC message is not received, the communication method further comprises:

generating the response message without performing the random access for the second cell group, and transmitting the response message using the cell of the first cell group.

3. An integrated circuit mountable on a terminal device configured and/or programmed to communicate with a base station apparatus using a first cell group and a second cell group, the integrated circuit causing the terminal device to perform at least:

receiving, in a radio resource control (RRC) message, an information element indicating performing a random access for the second cell group as a configuration of the second cell group, the information element including a RRC timer corresponding to the random access for the second cell group and a preamble used for the random access;

performing the random access using the preamble for the second cell group;

starting counting the RRC timer;

generating a response message for the RRC message without waiting to receive result notification of the random access; and transmitting the response message using a cell of the first cell group, wherein in a case that the information element included in the RRC message is not received, the integrated circuit further causes the terminal device to perform:

generating the response message without performing the random access for the second cell group, and transmitting the response message using the cell of the first cell group.

* * * * *